US008156268B2

(12) United States Patent
Uno

(10) Patent No.: US 8,156,268 B2
(45) Date of Patent: *Apr. 10, 2012

(54) MULTIFUNCTION PERIPHERAL

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 947 days.

This patent is subject to a terminal disclaimer.

(21) Appl. No.: 12/055,309

(22) Filed: Mar. 25, 2008

(65) Prior Publication Data

US 2008/0239358 A1    Oct. 2, 2008

(30) Foreign Application Priority Data

Mar. 28, 2007 (JP) ................. 2007-084773

(51) Int. Cl.
*G06F 13/12* (2006.01)
*G06F 13/38* (2006.01)

(52) U.S. Cl. ............................ 710/64; 710/16
(58) Field of Classification Search .............. 710/16, 710/64

See application file for complete search history.

(56) References Cited

U.S. PATENT DOCUMENTS

| | | |
|---|---|---|
| 5,239,632 A | 8/1993 | Larner |
| 5,903,733 A * | 5/1999 | Hong ........................... 709/232 |
| 6,571,293 B1 | 5/2003 | Hong |
| 6,862,643 B2 * | 3/2005 | Wu et al. ....................... 710/302 |
| 7,111,121 B2 | 9/2006 | Oishi et al. |
| 7,346,714 B2 | 3/2008 | Fukunaga et al. |
| 7,526,580 B2 * | 4/2009 | Uno ............................... 710/14 |

(Continued)

FOREIGN PATENT DOCUMENTS

CN    1200512 A    12/1998

(Continued)

OTHER PUBLICATIONS

Japan Patent Office; Office Action in Japanese Patent Application No. 2007-084773 (counterpart to the above-captioned U.S. Patent Application) mailed Mar. 10, 2002.

(Continued)

*Primary Examiner* — Henry Tsai
*Assistant Examiner* — Eric Oberly
(74) *Attorney, Agent, or Firm* — Baker Botts L.L.P.

(57) ABSTRACT

A multifunction device has a plurality of functions and capable of being connected to a computer via a universal serial bus (USB) interface, the computer having an operating system (OS) installed thereon that recognizes the multifunction device as a device having at least one logic unit capable of transferring data according to a USB-compliant system, at least one of the at least one logic unit being a compound logic unit corresponding to two or more specific functions among the plurality of functions. The multifunction device includes: a controlling unit that, when the computer has transferred output data with an actual data section to the compound logic unit, determines which one of the two or more specific functions the transferred output data is for controlling, based on unique standard data included in the actual data section, and that controls the determined function based on the output data, the controlling unit storing unique standard data in an actual data section of input data to be transferred to the computer as a result of controlling the function, the unique standard data indicating from which one of the two or more specific functions the input data is to be transferred, and transferring the input data to the computer as data from the compound logic unit.

8 Claims, 20 Drawing Sheets

U.S. PATENT DOCUMENTS

| | | | |
|---|---|---|---|
| 7,594,040 B2 * | 9/2009 | Oshima et al. | 710/8 |
| 2004/0064461 A1 * | 4/2004 | Pooni et al. | 707/100 |
| 2005/0023339 A1 | 2/2005 | Uno | |
| 2007/0245055 A1 | 10/2007 | Minami | |

FOREIGN PATENT DOCUMENTS

| | | |
|---|---|---|
| CN | 1542630 A | 11/2004 |
| JP | H06-044181 A | 2/1994 |
| JP | H11-008635 A | 1/1999 |
| JP | 2001222503 A | 8/2001 |
| JP | 2004-005168 A | 1/2004 |
| JP | 2004-054896 A | 2/2004 |
| JP | 2004-207908 A | 7/2004 |
| JP | 2005-018645 A | 1/2005 |
| JP | 2005175936 A | 6/2005 |
| JP | 2006-079634 A | 3/2006 |
| JP | 2006-178704 A | 7/2006 |
| JP | 2006-293777 A | 10/2006 |
| JP | 2007-279932 A | 10/2007 |

OTHER PUBLICATIONS

Toshinobu Teraguchi, Create Your Own PC to Make Your PC User-friendly! Windows 2000 Environment Improvement Committee, Windows 2000 World, Nov. 1, 2000, p. 182, vol. 7, No. 11, IDG Japan, Inc., Japan.

The State Intellectual Property Office of the People'S Republic of China, Notification of First Office Action in counterpart Patent Application No. CN 200810087466.4, mailed Nov. 6, 2009.

Patent Office of the People'Republic of China, Decision on Rejection for Chinese Patent Application No. 200810087467.9 (counterpart to co-pending U.S. Appl. No. 12/055,066), issued Dec. 3, 2010.

The State Intellectual Property Office of the People's Republic of China, Notification of First Office Action for Chinese Patent Application No. 200810087467.9 (counterpart to co-pending U.S. Appl. No. 12/055,066), issued Oct. 9, 2009.

Japan Patent Office, Office Action in Japanese Patent Application No. 2007-084771 (counterpart to co-pending U.S. Appl. No. 12/055,066), mailed Jan. 20, 2009.

* cited by examiner

MULTIFUNCTION PERIPHERAL

CROSS REFERENCE TO RELATED APPLICATION

This application claims priority from Japanese Patent Application No. 2007-84773 filed Mar. 28, 2007. The entire content of this priority application is incorporated herein by reference.

TECHNICAL FIELD

The present invention relates to a multifunction peripheral and a device control system.

BACKGROUND

A multifunction peripheral capable of being connected to a computer or the like via a USB (universal serial bus) interface has been produced commercially. A common configuration for such a multifunction peripheral known in the art includes endpoints for transferring data to a plurality of functions.

However, as the number of functions increases, the number of endpoints also increases, resulting in an expensive hardware construction that increases manufacturing costs for the multifunction peripheral. Hence, this configuration poses difficulties in providing a low-cost multifunction peripheral.

To resolve this problem, Japanese unexamined patent application publications Nos. 2001-222503 and 2005-175936 have proposed techniques for reducing the number of endpoints provided in a multifunction peripheral. The technology in Japanese unexamined patent application publication No. 2001-222503, for example, enables a host device to selectively access a plurality of functions via the same endpoints by emulating a device that disconnects from a device having one function and connects to a device having another function.

The technology described in Japanese unexamined patent application publication No. 2005-175936 reduces the number of endpoints used for transferring data by performing data transfers using a control endpoint provided separately from data transfer endpoints.

However, with the technology disclosed in Japanese unexamined patent application publication No. 2001-222503, the device driver must be switched on the host device side (disabling the driver not being used and loading and enabling the driver to be used) each time one of the functions on the multifunction peripheral is used. Accordingly, considerable time is required for switching device drivers, and two or more functions cannot be used simultaneously.

Further, with the technology disclosed in Japanese unexamined patent application publication No. 2001-222503, when operating one function on the multifunction peripheral, it is not possible to switch to a different function until the operation of the first function is reliably ended. Accordingly, it is difficult to determine a suitable timing for controlling this switch.

In the technology disclosed in Japanese unexamined patent application publication No. 2005-175936, the control endpoint is used for data transfers. Therefore, when a large amount of data is being transferred, this data transfer can interfere with control, making it difficult to perform required control promptly.

Hence, even though the conventional technologies described above can reduce the number of required endpoints, the multifunction peripheral is less user-friendly and may interfere with suitable control.

SUMMARY

In view of the foregoing, it is an object of the present invention to provide a multifunction peripheral capable of reducing the number of endpoints without reducing user-friendliness or interfering with suitable control, and a device control system for controlling the multifunction peripheral.

In order to attain the above and other objects, the invention provides a multifunction device having a plurality of functions and capable of being connected to a computer via a universal serial bus (USB) interface, the computer having an operating system (OS) installed thereon that recognizes the multifunction device as a device having at least one logic unit capable of transferring data according to a USB-compliant system such that the computer can use the plurality of functions of the multifunction device by exchanging input/output data with the logic unit, at least one of the at least one logic unit being a compound logic unit corresponding to two or more specific functions among the plurality of functions. The multifunction device includes: a controlling unit that, when the computer has transferred output data with an actual data section to the compound logic unit, determines which one of the two or more specific functions the transferred output data is for controlling, based on unique standard data included in the actual data section, and that controls the determined function based on the output data, the controlling unit storing unique standard data in an actual data section of input data to be transferred to the computer as a result of controlling the function, the unique standard data indicating from which one of the two or more specific functions the input data is to be transferred, and transferring the input data to the computer as data from the compound logic unit.

According to another aspect, the present invention provides, a device control system including: a computer; and a multifunction device having a plurality of functions, the computer and the multifunction device being connected with each other via a universal serial bus (USB) interface. The computer has an operating system (OS) installed thereon that recognizes the multifunction device as a device having at least one logic unit capable of transferring data according to a USB-compliant system such that the computer can use the plurality of functions of the multifunction device by exchanging input/output data with the logic unit, at least one of the at least one logic unit being a compound logic unit corresponding to two or more specific functions among the plurality of functions. The computer includes a computer controlling unit that, based on an instruction from a data processor functioning on the computer to control one of the two or more functions of the multifunction device, stores unique standard data for controlling the one of the two or more specific functions in an actual data section of the output data and transfers the output data to the compound logic unit, the computer controlling unit determining, when input data is transferred from the multifunction device to the computer, from which of the two or more specific functions the input data has been transferred, based on unique standard data included in an actual data section of the input data, and transferring the input data to the data processor that has originally instructed. The multifunction device includes a device controlling unit that, when the computer has transferred output data with an actual data section to the compound logic unit, determines which one of the two or more specific functions the transferred output data is for controlling, based on unique standard data included in the actual data section, and that controls the determined function based on the output data, the device controlling unit storing unique standard data in an actual data section of input data to be transferred to the computer as a result of controlling the function, the unique standard data indicating from which one of the two or more specific functions the input data is to be transferred, and transferring the input data to the computer as data from the compound logic unit.

BRIEF DESCRIPTION OF THE DRAWINGS

In the drawings:

FIG. 9 is a flowchart illustrating steps in a process executed on the PC while the power to the PC is on;

DETAILED DESCRIPTION

In the following description, a logic unit is a physical unit that the OS of a computer recognizes as a data transfer object capable of transferring data according to a USB-compliant method.

More specifically, the OS in a computer recognizes a USB device having a single function as a single transfer object. In this case, the USB device with the single function is recognized as a device having one logic unit.

The OS of a computer recognizes a USB compound device provided with a plurality of functions as a plurality of data transfer objects corresponding to the plurality of functions. In this case, the USB compound device is recognized as a device having a plurality of logic units.

Further, a USB storage class device can have a plurality of logic unit numbers (LUNs) for a single device, and the OS of a computer recognizes each individual data transfer object corresponding to each of the plurality of LUNs. In this case, the USB storage device having a plurality of LUNs is recognized as a device having a plurality of logic units.

In order to implement data transfers between the computer and a logic unit for a USB device having a single function, an input endpoint and an output endpoint are prepared for each logic unit. Similarly, in order to implement data transfers between the computer and logic units for a USB compound device, an input endpoint and an output endpoint are prepared for each logic unit. Contrarily, in order to implement data transfers between the computer and logic units for a USB storage device having a plurality of LUNs, an input endpoint and an output endpoint shared by the plurality of logic units are prepared.

In the USB device with a single function and the USB compound device, the endpoints are used for a single logic unit. In the USB storage device having the plurality of LUNs, endpoints are shared by a plurality of logic units. However, in all the types of USB devices, both of an input endpoint and an output endpoint exist for a single logic unit. A single control endpoint is also prepared for a USB device in addition to the input and output endpoints.

Next, embodiments of the present invention will be described while referring to the accompanying drawings.

(1) FIRST EMBODIMENT

Structure of a Device Control System

Figure 1:
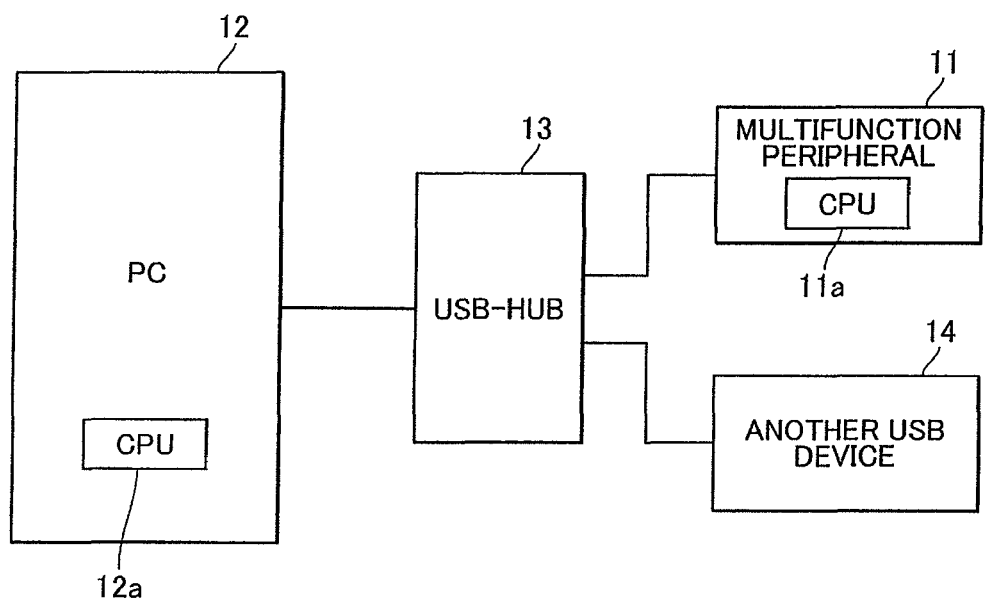
FIG. 1 is a block diagram showing an overall device control system according to a first embodiment of the present invention.

FIG. 1 is a block diagram showing the overall structure of a device control system according to the first embodiment of the present invention.

The device control system includes a multifunction peripheral 11 and a personal computer (PC) 12. Both the multifunction peripheral 11 and PC 12 have a USB interface and are connected to each other via a USB hub 13 so that data can be exchanged between the two. Another USB device 14, for example, is also connected to the USB hub 13. The multifunction peripheral 11 has a CPU 11a. The PC 12 has a CPU 12a.

In the embodiment, the multifunction peripheral 11 is a device possessing multiple functions, including a printer function, scanner function, PC-FAX function, and card reader function. These functions can be controlled from the PC 12.

Internal Structure of the Multifunction Peripheral

Figure 2:
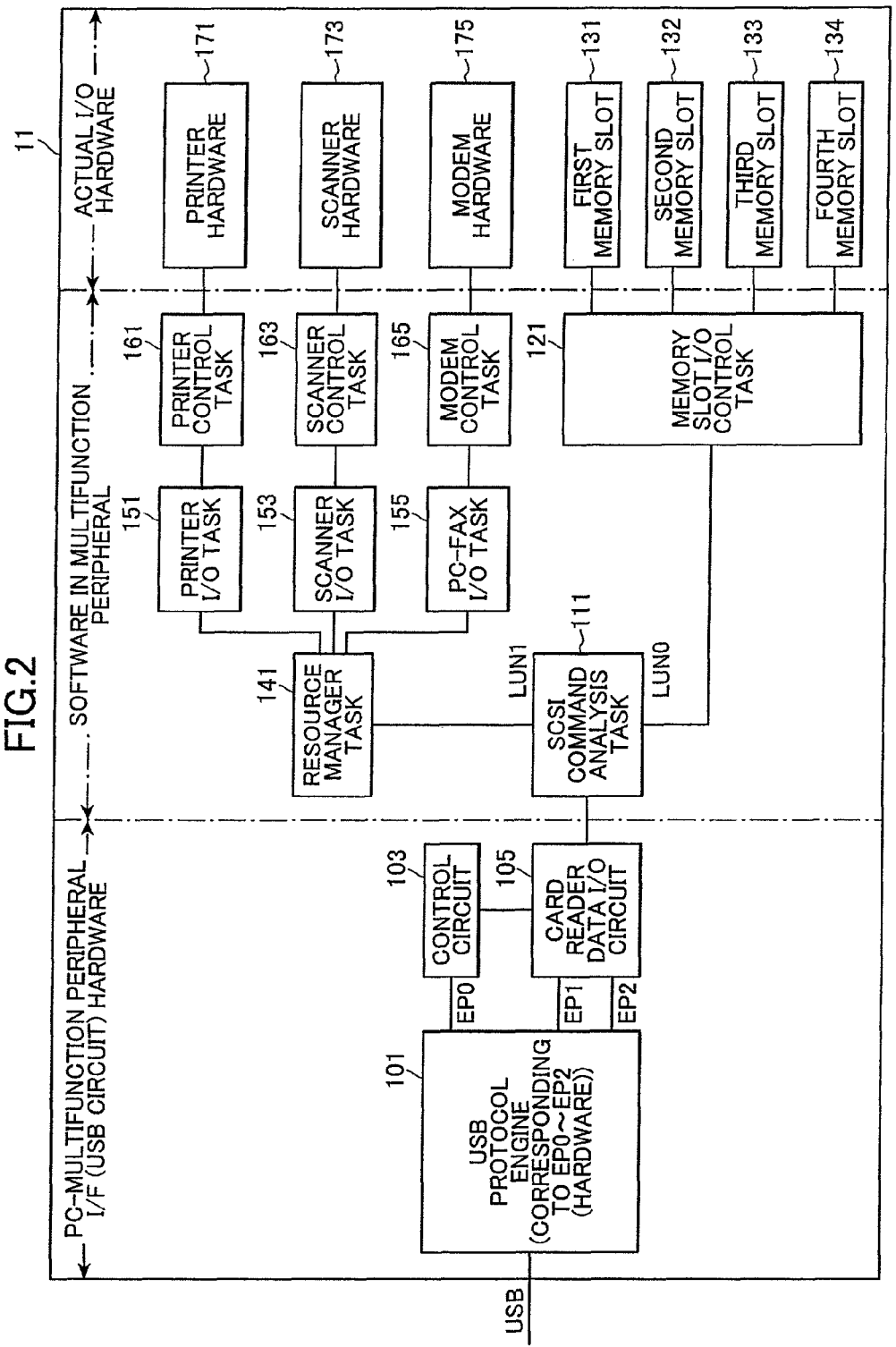
FIG. 2 is a block diagram showing the internal structure of a multifunction peripheral according to the first embodiment.

FIG. 2 is a block diagram showing the internal structure of the multifunction peripheral 11. The multifunction peripheral 11 is equipped with hardware constituting a USB interface, including a USB protocol engine 101, a control circuit 103, and a card reader data I/O circuit 105. The USB protocol engine 101 controls data transfers between the multifunction peripheral 11 and PC 12 according to the USB communication protocol.

This hardware is configured so that data is transferred between the PC 12 and the multifunction peripheral 11 via endpoints. More specifically, the control circuit 103 inputs and outputs various control data to and from the PC 12 (bidirectional communications) through a control transfer endpoint (hereinafter abbreviated as EP0).

On the other hand, the card reader data I/O circuit 105 transfers input data to the PC 12 through an input data endpoint (hereinafter abbreviated as EP1), and acquires output data transferred from the PC 12 via an output data endpoint (hereinafter abbreviated as EP2).

The multifunction peripheral 11 is also provided with a SCSI command analysis task 111 as one of its software functions. When data is transferred from the card reader data I/O circuit 105 to the SCSI command analysis task 111, the SCSI command analysis task 111 redirects the data between an LUN0 side and an LUN1 side based on information included in the transferred data.

When data is transferred from either the LUN0 side or the LUN1 side to the SCSI command analysis task 111, the SCSI command analysis task 111 transfers this data to the card reader data I/O circuit 105.

When redirecting data to the LUN0 side, the SCSI command analysis task 111 transfers this data to a memory slot I/O control task 121. The memory slot I/O control task 121 is software functioning to control a first memory slot 131, a second memory slot 132, a third memory slot 133, and a fourth memory slot 134.

Each of the first through fourth memory slots 131-134 is a slot that accepts a memory card and each slot accepts a memory card of a different standard than the other slots.

In the embodiment, the first through fourth memory slots 131-134 are configured for exclusive use. For example, when a card is inserted into the first memory slot 131, other slots are unusable until that memory card is removed.

On the other hand, when diverting data to the LUN1 side, the SCSI command analysis task 111 transfers the data to a resource manager task 141. The resource manager task 141 in turn diverts the data to one of a printer I/O task 151, a scanner I/O task 153, and a PC-FAX I/O task 155 based on unique standard data included in the actual data section of the data.

Further, when one of the printer I/O task 151, scanner I/O task 153, and PC-FAX I/O task 155 transfer data to the resource manager task 141, the resource manager task 141 relays the data to the SCSI command analysis task 111.

The printer I/O task 151, scanner I/O task 153, and PC-FAX I/O task 155 control printer hardware 171, scanner hardware 173, and modem hardware 175, respectively, via a printer control task 161, a scanner control task 163, and a modem control task 165, respectively.

The OS of the PC 12 recognizes, as a logic unit corresponding to LUN0, the structure under control of the memory slot I/O control task 121 in the multifunction peripheral 11. Further, the OS of the PC 12 recognizes the structure under control of the resource manager task 141 as a logic unit corresponding to LUN1.

Moreover, the configuration under the control of the resource manager task 141 corresponds to the printer function, scanner function, and PC-FA function. Therefore, the logic unit corresponding to LUN1 is equivalent to a compound logic unit.

Figure 3:
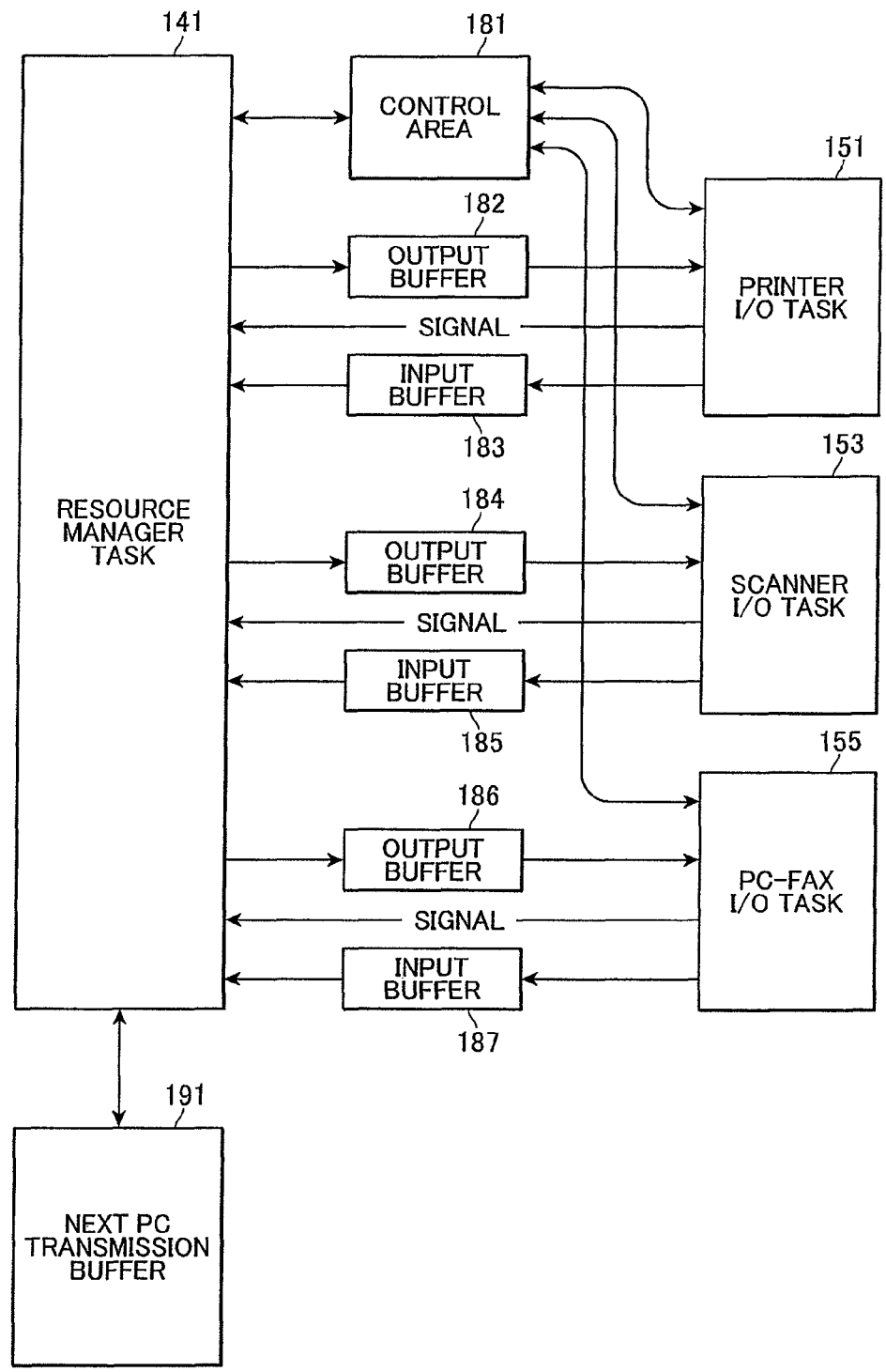
FIG. 3 is a block diagram showing the internal structure of a part of the multifunction peripheral in greater detail.

FIG. 3 is a block diagram showing data transfer paths between the printer I/O task 151, scanner I/O task 153, PC-FAX I/O task 155, and resource manager task 141 in greater detail.

The printer I/O task 151, scanner I/O task 153, and PC-FAX I/O task 155 are configured to exchange various data with the resource manager task 141 via shared memory for data transfers.

More specifically, the shared memory includes a control area 181 shared by the printer I/O task 151, scanner I/O task 153, and PC-FAX I/O task 155. The control area 181 is used when control data is transferred between the resource manager task 141 and the printer I/O task 151, scanner I/O task 153, and PC-FAX I/O task 155.

The shared memory also includes an output buffer 182 and an input buffer 183 corresponding to the printer I/O task 151. The output buffer 182 and input buffer 183 are used for transferring data between the printer I/O task 151 and resource manager task 141. The printer I/O task 151 can also transfer a signal directly to the resource manager task 141.

The shared memory also includes an output buffer 184 and an input buffer 185 corresponding to the scanner I/O task 153. The output buffer 184 and input buffer 185 are used for transferring data between the scanner I/O task 153 and the resource manager task 141. The scanner I/O task 153 can also transfer a signal directly to the resource manager task 141.

The shared memory also includes an output buffer 186 and an input buffer 187 corresponding to the PC-FAX I/O task 155. The output buffer 186 and input buffer 187 are used for transferring data between the PC-FAX I/O task 155 and the resource manager task 141. The PC-FAX I/O task 155 can also transfer a signal directly to the resource manager task 141.

The resource manager task 141 can also access a next PC transmission buffer 191 to read or write data. The next PC transmission buffer 191 functions to temporarily store data to be transmitted to the PC 12 in the next transmission when such data is read in advance from the control area 181 or the input buffers 183, 185, and 187.

Internal Structure of the PC

Figure 4:
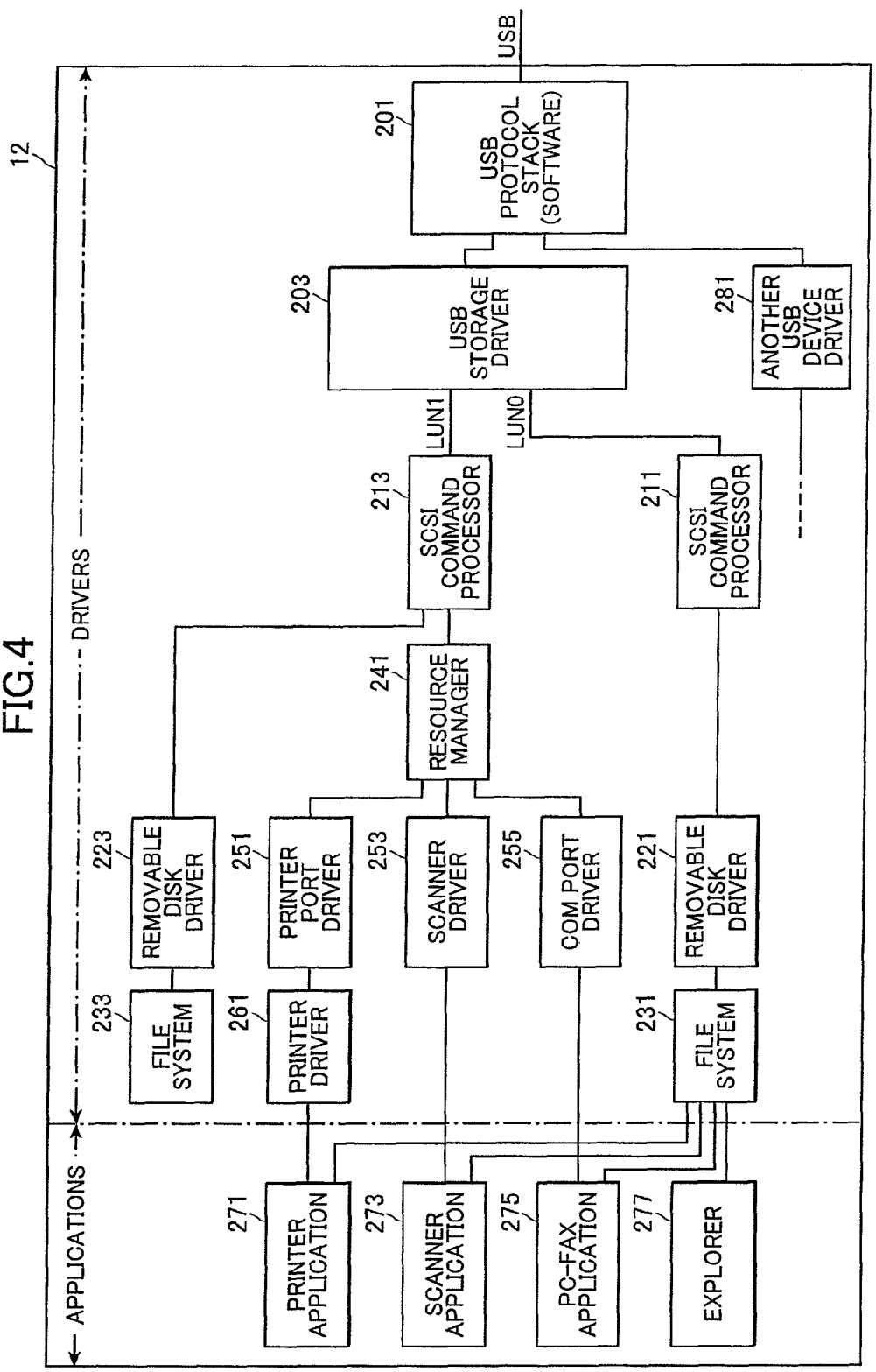
FIG. 4 is a block diagram showing the internal structure of a PC according to the first embodiment.

FIG. 4 is a block diagram showing the internal structure of the PC 12. The PC 12 has standard functions of the OS, such as a USB protocol stack 201, a USB storage driver 203, SCSI command processors 211 and 213, removable disk drivers 221 and 223, and file systems 231 and 233.

The PC 12 also has special software corresponding to the multifunction peripheral 11 functioning as a resource manager 241, a printer port driver 251, a scanner driver 253, a COM port driver 255, and a printer driver 261.

The PC 12 also includes application software that uses the above functions, such as a printer application 271, a scanner application 273, and a PC-FAX application 275.

The OS installed on the PC 12 is Windows (registered trademark) in the embodiment. Therefore, the PC 12 also includes Explorer 277 as software that comes bundled with Windows. However, an OS other than Windows may be installed on the PC 12, provided that the OS can implement the same functions.

The PC 12 also includes another USB device driver 281 corresponding to the USB device 14.

Figure 5:
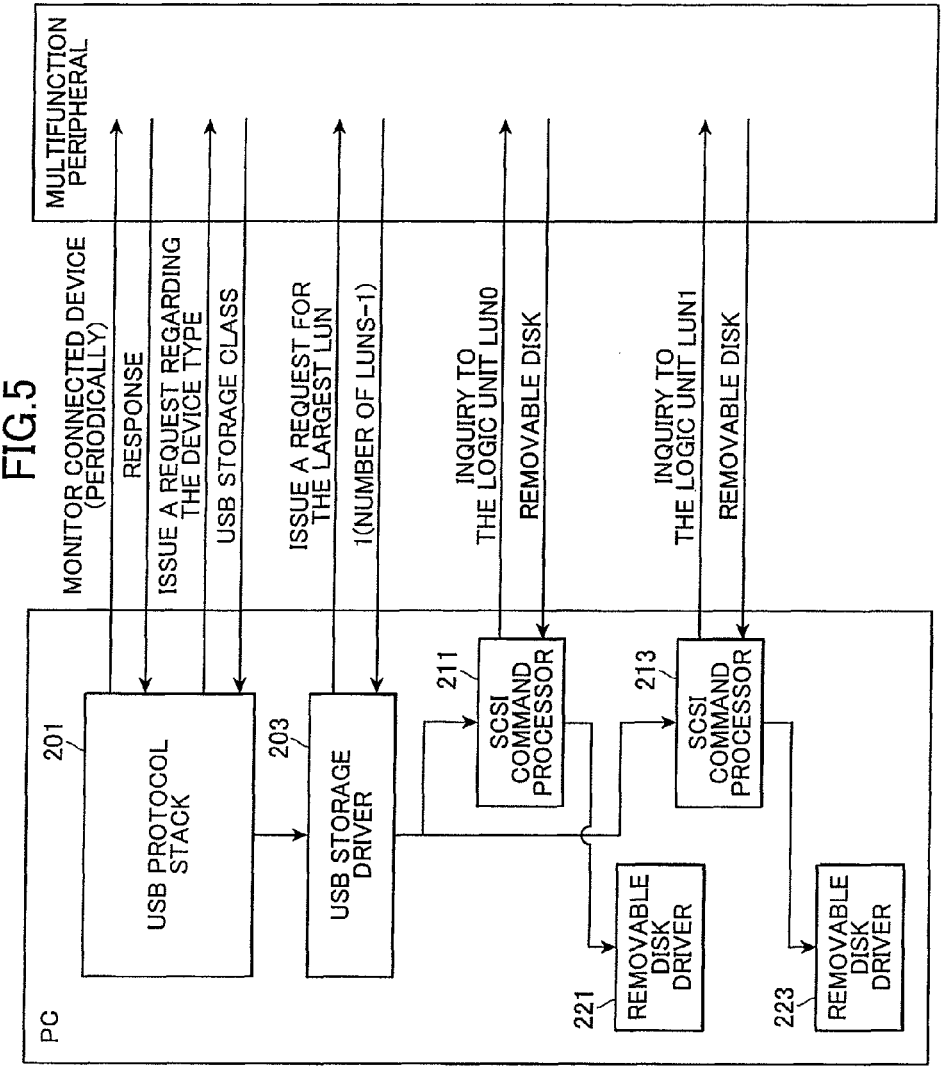
FIG. 5 is an explanatory diagram showing data exchanged when establishing a connection between the PC and multifunction peripheral.

With this construction, the USB protocol stack 201 begins functioning when the PC 12 is started and, thereafter, periodically monitors whether a USB device is connected to the PC 12, as illustrated in FIG. 5.

Since the multifunction peripheral 11 returns a response to the PC 12 when the multifunction peripheral 11 is connected to the PC 12, the USB protocol stack 201 issues a request to the multifunction peripheral 11 for a response regarding the device type. Upon receiving this request, the multifunction peripheral 11 returns a response indicating that the multifunction peripheral 11 is a USB storage class device (specifically, the CPU 11a provided in the multifunction peripheral 11 is configured to return this response, for example). Accordingly, the PC 12 loads the USB storage driver 203 so that the USB storage driver 203 is running in the background.

When started, the USB storage driver 203 issues a request to the multifunction peripheral 11 for the largest LUN. Upon receiving this request, the multifunction peripheral 11 returns the largest LUN (LUN1 in this example). Consequently, the PC 12 creates the two SCSI command processors 211 and 213 corresponding to the LUN0 and LUN1. The SCSI command processors 211 and 213 serve as ports for transferring SCSI commands to the multifunction peripheral 11 via the USB storage driver 203.

When created, the SCSI command processor 211 issues a SCSI command "Inquiry" to the logic unit LUN0. Upon receiving this inquiry, the multifunction peripheral 11 returns a response indicating that the device type is a removable disk. Accordingly, the PC 12 loads the removable disk driver 221.

In this way, the logic unit corresponding to LUN0 is linked to the file system 231 and, consequently, a drive letter is assigned to the logic unit LUN0. Thereafter, the logic unit LUN0 can be accessed by specifying this drive letter. The multifunction peripheral 11 is configured so that the logic unit corresponding to LUN0 is under the control of the memory slot I/O control task 121.

The SCSI command processor 213 executes the same process as the SCSI command processor 211, namely, issuing a SCSI command "Inquiry" to the LUN1 logic unit. Upon receiving this inquiry, the multifunction peripheral 11 (more specifically, the CPU 11a) returns a response indicating the device type is a removable disk.

Here, the logic unit corresponding to LUN1 in the multifunction peripheral 11 is under the control of the resource manager task 141. Specifically, this logic unit corresponds to the printer function, scanner function, and PC-FAX function.

Hence, while this structure is not equivalent to a removable disk, the multifunction peripheral 11 returns a response indicating a removable disk. As a result, the logic unit emulates a removable disk for the OS of the PC 12.

Accordingly, the PC 12 loads the removable disk driver 223, linking the LUN1 logic unit to the file system 233. This results in a drive letter being assigned to the LUN1 logic unit.

However, since the removable disk associated with the drive letter is a pseudo device, as described above, a device equivalent to a removable disk actually does not exist. Therefore, the display settings are modified so that the existence of this pseudo removable disk does not appear to the user through normal operations.

As a result, while a drive letter has been assigned internally to the pseudo removable disk, the pseudo removable disk is set to not display, even when Explorer 277 displays a list of devices connected to the PC 12, for example.

With the construction described above, it is possible to access a memory card mounted in any one of the first through fourth memory slots 131-134 using the drive letter assigned to the LUN0 logic unit.

For example, if the user performs an operation using the Explorer 277 on a file in a memory card mounted in the first memory slot 131, the Explorer 277 transfers a command to the multifunction peripheral 11 via the file system 231, removable disk driver 221, SCSI command processor 211, USB storage driver 203, and USB protocol stack 201.

The multifunction peripheral 11 then returns a response to the Explorer 277 via the USB protocol stack 201, USB storage driver 203, SCSI command processor 211, removable disk driver 221, and file system 231.

Print data outputted from the printer application 271 is transferred to the resource manager 241 via the printer driver 261 and printer port driver 251. Further, scanner control data outputted from the scanner application 273 is transferred to the resource manager 241 via the scanner driver 253, and PC-FAX data outputted from the PC-FAX application 275 is transferred to the resource manager 241 via the COM port driver 255.

The resource manager 241 stores the various data described above in an actual data section of data targeted for transmission as vendor-specific data enabling the resource manager task 141 of the multifunction peripheral 11 to process the data.

By issuing an instruction to write this data to the above pseudo removable disk, the resource manager 241 transfers the data to the multifunction peripheral 11 via the SCSI command processor 213, USB storage driver 203, and USB protocol stack 201.

In some cases, the above data transfer results in input data being transferred from the multifunction peripheral 11 to the PC 12. For example, when scanner control data is transferred to the multifunction peripheral 11, the scanner function on the multifunction peripheral 11 is activated, resulting in scanner data being transferred from the multifunction peripheral 11 side.

When such input data is transferred to the PC 12, the data is directed to the resource manager 241 via the USB protocol stack 201, USB storage driver 203, and SCSI command processor 213.

The resource manager 241 extracts the vendor-specific data from the actual data section in the transferred data and relays this data to one of the printer port driver 251, scanner driver 253, and COM port driver 255 after determining the appropriate destination.

When the multifunction peripheral 11 transfers scanner data, for example, this data is relayed to the scanner application 273 via the scanner driver 253.

If the transferred data is status data for the printer function (such as data related to a print error), then the resource manager 241 relays this data to the printer application 271 via the printer port driver 251 and printer driver 261.

If the transferred data is facsimile reception data received with the PC-FAX function, the resource manager 241 relays this data to the PC-FAX application 275 via the COM port driver 255.

Figure 6:
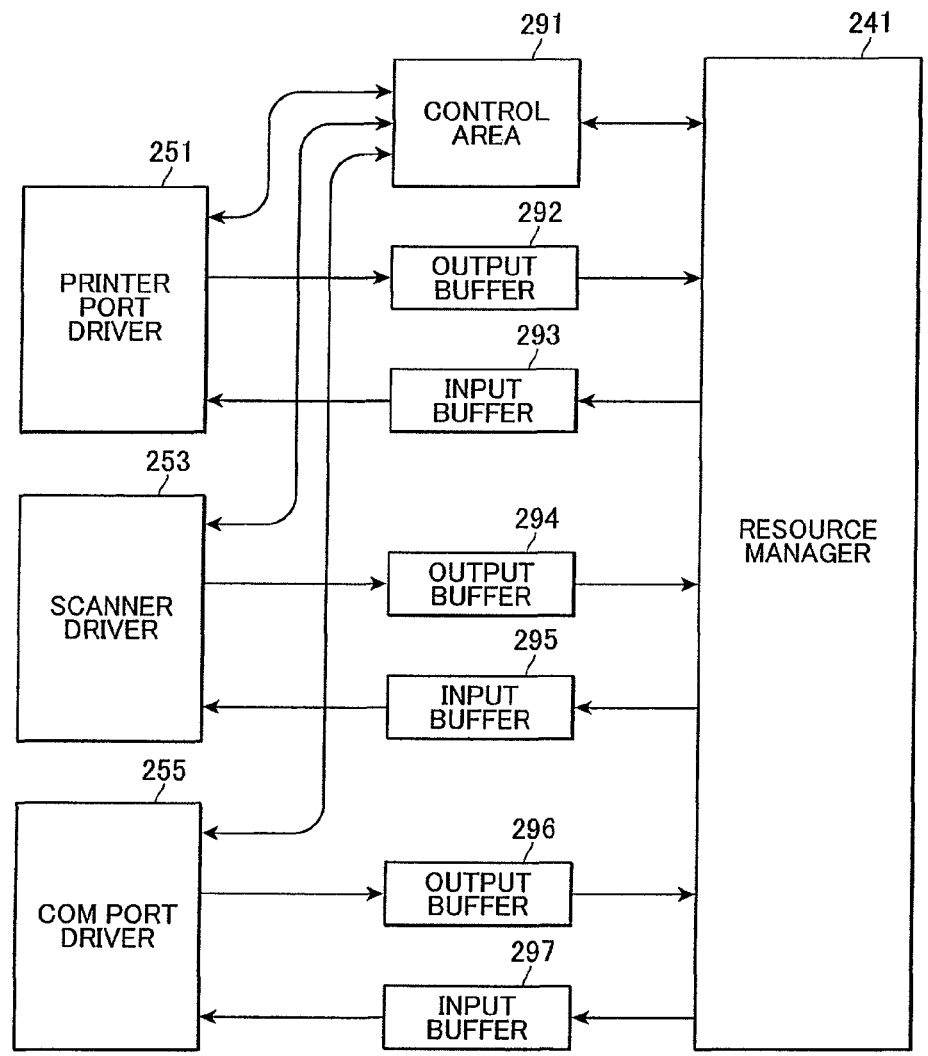
FIG. 6 is a block diagram showing the internal structure of a part of the PC in greater detail.

FIG. 6 is a block diagram detailing the data transfer paths between the resource manager 241 and the printer port driver 251, scanner driver 253, and COM port driver 255.

The printer port driver 251, scanner driver 253, and COM port driver 255 are configured to exchange various data with the resource manager 241 through shared memory for data transfers.

More specifically, the shared memory includes a control area 291 shared by the printer port driver 251, scanner driver 253, and COM port driver 255. The control area 291 is used for transferring control data between the printer port driver 251, scanner driver 253, and COM port driver 255 and the resource manager 241.

The shared memory also includes an output buffer 292 and an input buffer 293 corresponding to the printer port driver 251. The output buffer 292 and input buffer 293 are used for transferring data between the printer port driver 251 and resource manager 241.

The shared memory also includes an output buffer 294 and an input buffer 295 corresponding to the scanner driver 253. The output buffer 294 and input buffer 295 are used for transferring data between the scanner driver 253 and resource manager 241.

The shared memory also includes an output buffer 296 and an input buffer 297 corresponding to the COM port driver 255. The output buffer 296 and input buffer 297 are used for transferring data between the COM port driver 255 and resource manager 241.

With the multifunction peripheral 11 and PC 12 having the construction described above, data transferred between the resource manager 241 and resource manager task 141 has a structure based on the SCSI standard.

A data structure compliant with the SCSI standard is capable of holding the vendor-specific data mentioned above. The vendor-specific data should be data prepared in a unique standard that can be recognized by the resource manager 241 and resource manager task 141. However, the OS and the like will not detect the content of the vendor-specific data.

Hence, actual data exchanged between the resource manager 241 and resource manager task 141 is transferred as this vendor-specific data, enabling arbitrary data to be exchanged in a system conforming to the SCSI standard. Further, since the USB standard specifies a method of exchanging data for a system conforming to the SCSI standard, if arbitrary data can be exchanged in the system conforming to the SCSI standard, then arbitrary data can similarly be exchanged in a system conforming to the USB standard.

Process for Installing Multifunction Peripheral Software

Next, a process for installing multifunction peripheral software on the PC 12 enabling the PC 12 to use the multifunction peripheral 11 having the above construction will be described with reference to the flowcharts in FIGS. 7 and 8. This process is executed by the CPU 12a provided in the PC 12 shown in FIG. 1.

Figure 7:
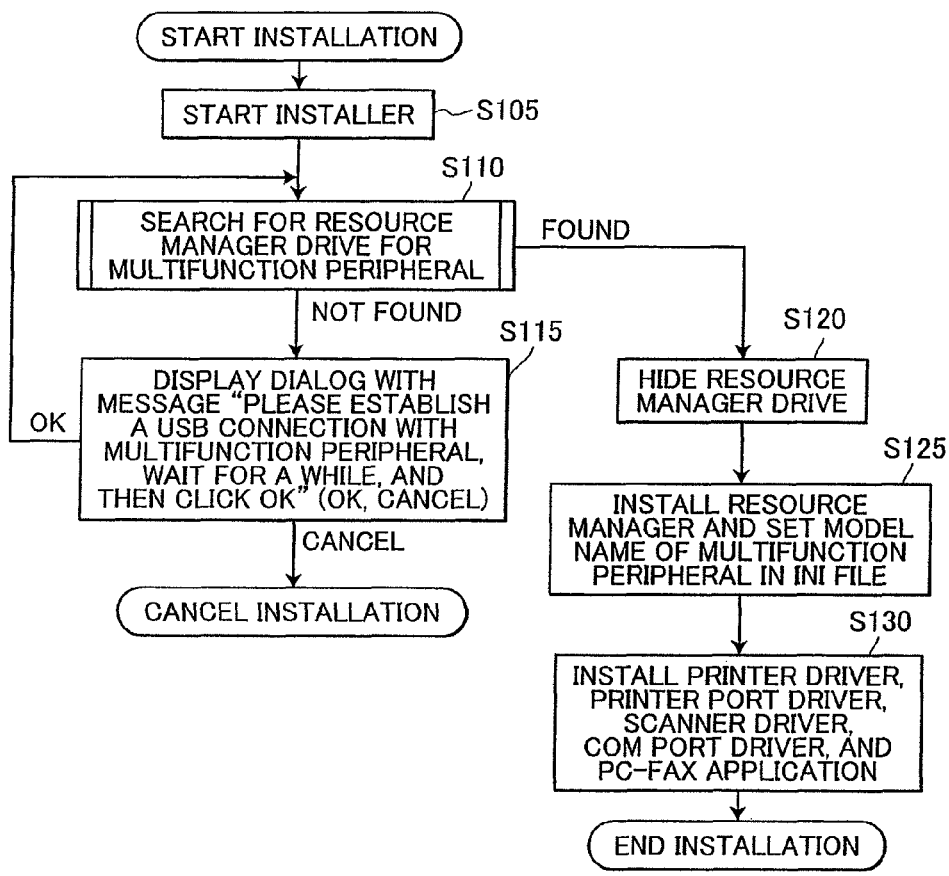
FIG. 7 is a flowchart illustrating steps in an installation process executed by the PC for installing multifunction peripheral software.

In S105 at the beginning of the process shown in FIG. 7, the PC 12 launches an installer. This process may be executed when the user performs a prescribed operation or may be executed automatically when a CD-ROM or other medium is inserted into a CD-ROM drive or the like.

After the installer is launched, in S110 the PC 12 searches for the resource manager drive of the multifunction peripheral 11. This process is described in greater detail with reference to FIG. 8.

Figure 8:
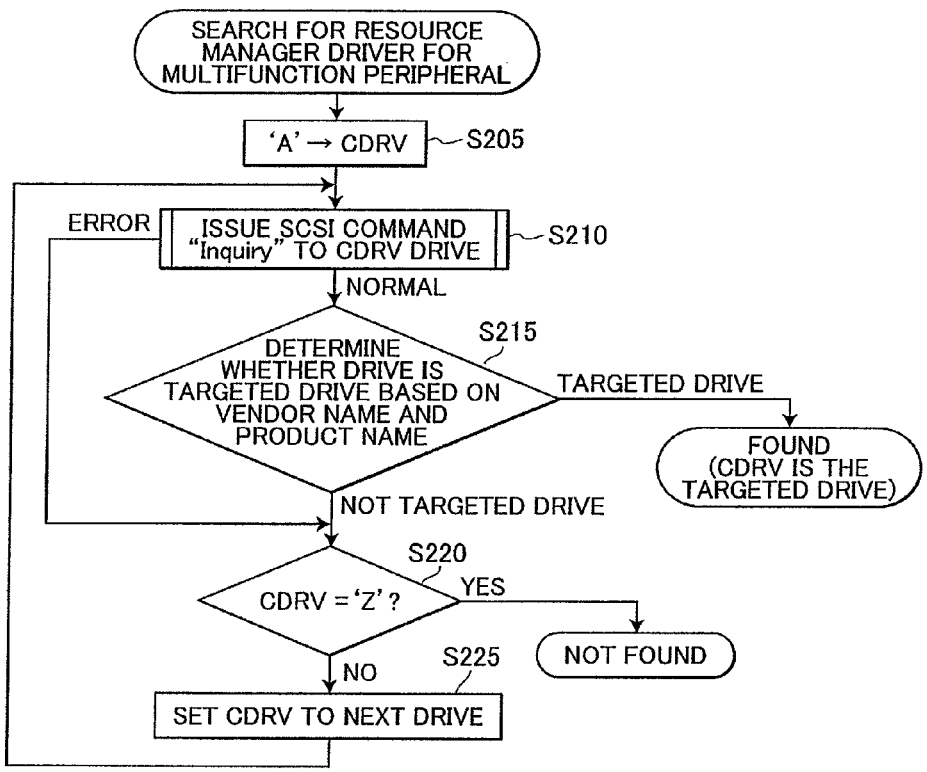
FIG. 8 is a flowchart illustrating steps in a part of the installation process in greater detail.

Specifically, in S205 of FIG. 8, the PC 12 sets a variable CDRV initially to drive letter "A" to begin searching drive letters "A" through "Z" in order. In S210 the PC 12 issues a SCSI command "Inquiry" to the drive CDRV (drive "A" immediately after performing S205, for example). This command is used to reference the device type and the like.

If a response to the command is returned normally in S210 (S210: normal), then in S215 the PC 12 determines whether drive CDRV is the drive corresponding to the multifunction peripheral 11 targeted by the program based on the vendor name and product name included in the response.

If drive CDRV is the targeted drive (S215: targeted drive), then the PC 12 ends the process in FIG. 8 since the drive corresponding to the multifunction peripheral 11 has been found.

However, if the drive CDRV does not correspond to the multifunction peripheral 11 (S215: not targeted drive) or if an error was returned in response to the command issued in S210 (S210: error), the PC 12 advances to S220. In S220 the PC 12 determines whether the drive letter set for the variable CDRV is "Z".

If the variable CDRV is not set to drive letter "Z" (S220: NO), then in S225 the PC 12 sets the variable CDRV to the drive letter of the next drive (for example, drive "B" if the current drive letter is "A"), and returns to S210.

In this way, the process in S210-S220 is repeated until the drive letter set for variable CDRV is "Z" or the targeted drive letter is found. If the PC 12 determines in S215 that the targeted drive has been found while repeating the process in S210-S220, the PC 12 ends the process in FIG. 8.

On the other hand, if the drive letter set for variable CDRV is "Z" (S220: YES), then the above process has been performed for all drive letters "A" through "Z". In this case, the drive corresponding to the targeted multifunction peripheral 11 could not be found, and the PC 12 ends the process of FIG. 8.

The process in S110 of FIG. 7 is completed after completing the process of FIG. 8 described above. If the resource manager drive was not found in the process of S110 in FIG. 7 (S110: not found), then in S115 the PC 12 displays a dialog box for the user with the message "Please establish a USB connection with the multifunction peripheral, wait for a while, and then click OK."

After performing the process in S115, the PC 12 waits for input from the user. In this example, the user can select either "OK" or "Cancel" in the dialog box displayed on the display unit of the PC 12. For example, the user can use a pointing device to click on an "OK" button or a "Cancel" button displayed on the display unit.

If the user selects "Cancel" (S115: cancel), the PC 12 cancels the installation process. However, if the user selects "OK" (S115: OK), then the PC 12 repeats the process in S110.

However, if the resource manager drive was found in S110 (S110: found), then in S120 the PC 12 hides the resource manager drive found above. Here, a setting indicating whether to display or hide a device to which a drive letter has been assigned is recorded in the registry of the OS (a storage area managed by the OS) for each drive letter.

Hence, in S120 the PC 12 sets the drive letter of the resource manager drive found in S110 as the target and modifies the setting in the registry to hide the device.

In S125 the PC 12 installs the resource manager and sets the model name of the multifunction peripheral in an INI file. An INI file is a text file storing various settings related to the resource manager.

The resource manager reads the contents of the INI file when executing a process described later. Through the process in S125, the model name of the multifunction peripheral acquired in S210 is stored in the INI file.

In S130 the PC 12 installs a printer driver, printer port driver, scanner driver, COM port driver, and PC-FAX application, and subsequently ends the process for installing multifunction peripheral software.

An Example Process Executed on the PC when the Power is on

Next, an example process executed on the PC (especially, the CPU 12a) from the moment the PC is turned on until the moment the PC is turned off will be described with reference to FIGS. 9 through 12. The following description covers the case in which the power switch of the PC 12 is turned on, while the power switch of the multifunction peripheral 11 is already on.

Figure 9:
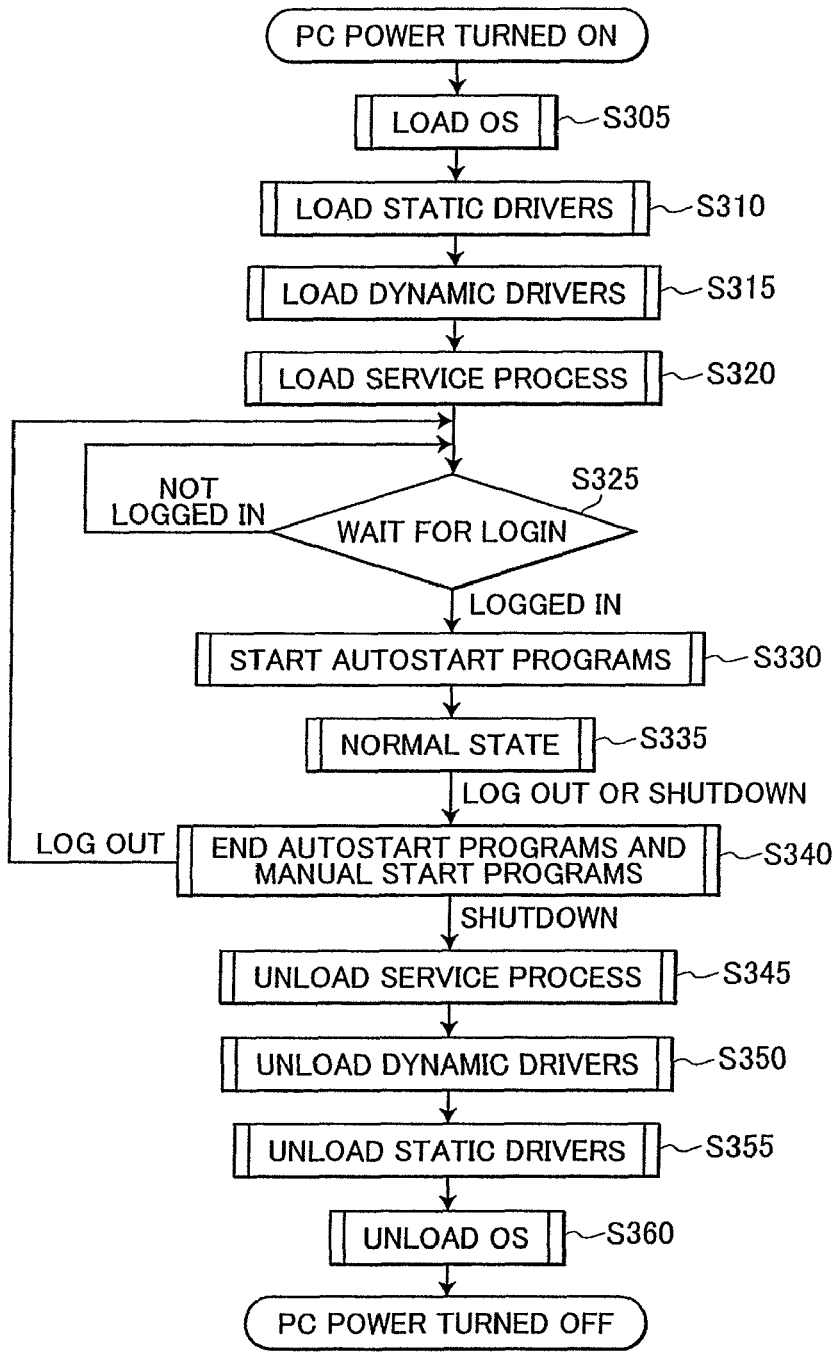

When the power switch of the PC 12 is turned on, first the PC 12 loads the OS in S305 of FIG. 9. In S310 the PC 12 loads static drivers. This process of S310 will be described in greater detail next with reference to FIG. 10.

Figure 10:
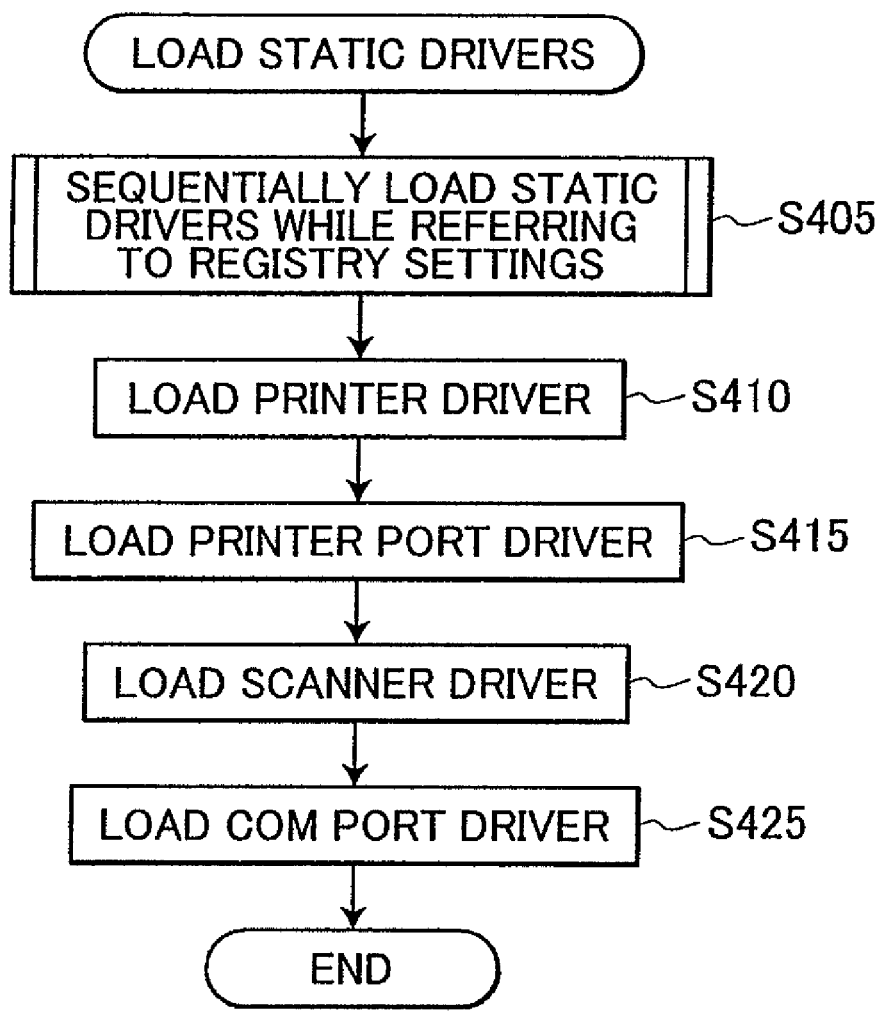
FIG. 10 is a flowchart illustrating steps in a process executed on the PC for loading static drivers.

As shown in FIG. 10, in S405 the OS of the PC 12 sequentially loads static drivers while referencing registry settings. Subsequently, the PC 12 loads a printer driver in S410, loads a printer port driver in S415, loads a scanner driver in S420, and loads a COM port driver in S425. After loading these drivers, the process in FIG. 10 ends.

The process in S310 of FIG. 9 is completed after completing the process shown in FIG. 10. Next, in S315 the PC 12 loads dynamic drivers. The process of S315 will be described next in detail with reference to FIG. 11.

Figure 11:
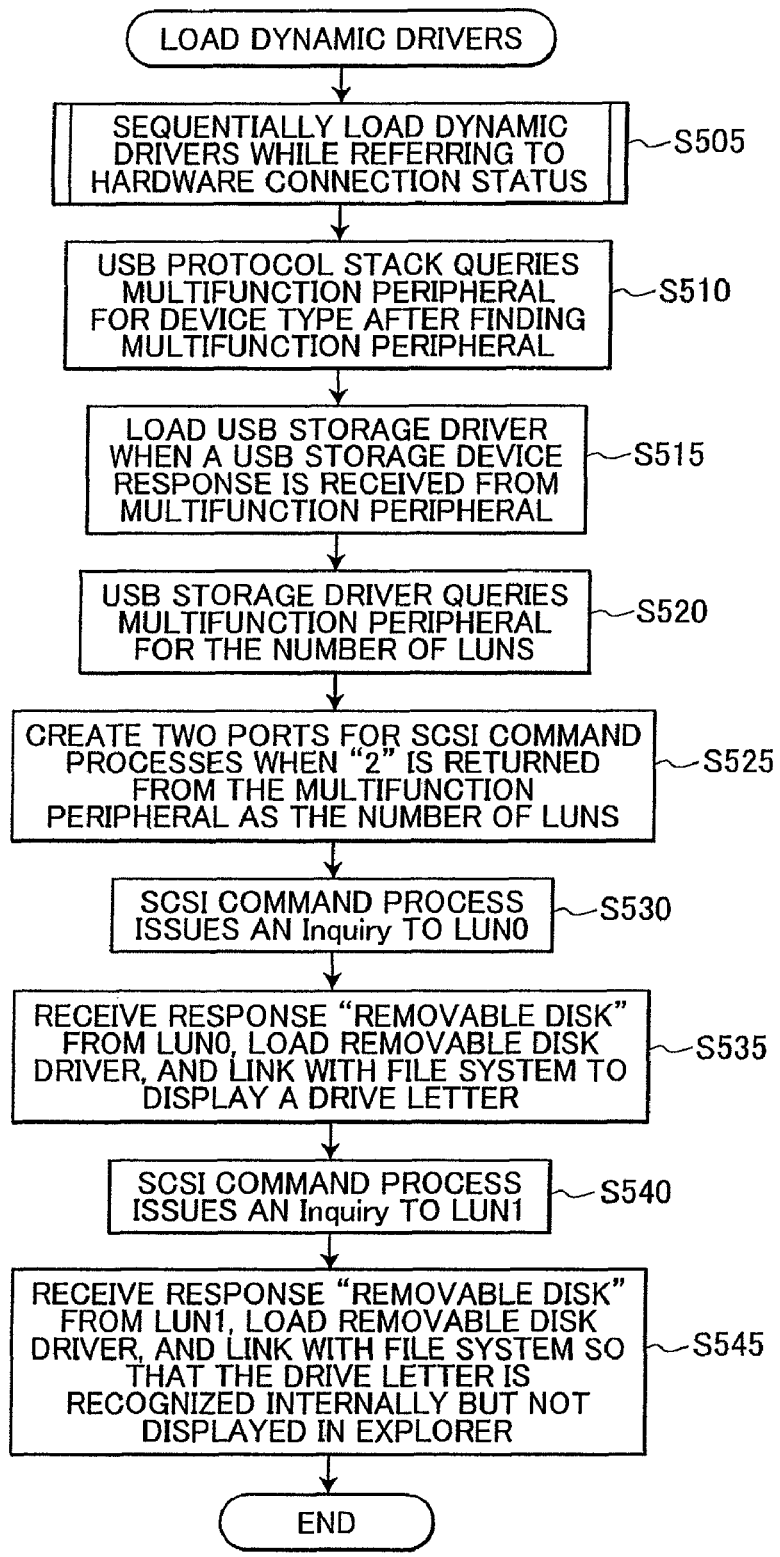
FIG. 11 is a flowchart illustrating steps in a process executed on the PC for loading dynamic drivers.

Specifically, in S505 of FIG. 11, the OS of the PC 12 sequentially loads dynamic drivers while referencing the status of hardware connections. In S510 the PC 12 queries the device type of the multifunction peripheral 11 after the USB protocol stack 201 has found the multifunction peripheral 11.

If there is a response to this query from the multifunction peripheral 11 indicating that the multifunction peripheral 11 is a USB storage device, in S515 the PC 12 loads the USB storage driver 203.

Since the USB storage driver 203 is put in a functioning state through the process of S515, in S520 the USB storage driver 203 queries the multifunction peripheral 11 for the number of LUNs. More specifically, in S520 the USB storage driver 203 issues an inquiry for the largest LUN.

In the case of the embodiment, the multifunction peripheral 11 has two logic units. Since a series of numbers are assigned to the logic units with the smallest LUN being "0", the multifunction peripheral 11 returns "1" as the largest LUN.

The PC 12 determines that the multifunction peripheral 11 has two LUNs based on the response of "1" for the largest LUN. In this case, in S525 the PC 12 creates two ports for the SCSI command process. Through the process of S525, the SCSI command processor 211 and SCSI command processor 213 are configured.

After the SCSI command processor 211 and SCSI command processor 213 are in a functioning state, in S530 the SCSI command processor 211 issues an "Inquiry" to the logic unit LUN0.

In response to this inquiry, in S535 the PC 12 receives the response "removable disk" from the logic unit LUN0. Here, the PC 12 loads the removable disk driver 221 and links the removable disk driver 221 to the file system 231, causing a drive letter to be assigned to the logic unit LUN0. The drive letter appears in Explorer 277.

In S540 the SCSI command processor 213 issues an inquiry to the logic unit LUN1. In response to this inquiry, the PC 12 receives data indicating the device type "removable disk" from the LUN1 logic unit.

The logic unit LUN1 in the multifunction peripheral 11 actually corresponds to the printer function, scanner function, and PC-FAX function of the multifunction peripheral 11 and does not function as a device equivalent to a removable disk. However, by returning a response indicating that the logic unit LUN1 is a removable disk, the multifunction peripheral 11 can make the OS of the PC 12 recognize two drives in the multifunction peripheral 11 as removable disks.

When the removable disk response is received from the logic unit LUN1, in S545 the PC 12 loads the removable disk driver 223 and links the removable disk driver 223 to the file system 233, causing a drive letter to be assigned to the logic unit LUN1.

However, the drive letter assigned to the logic unit LUN1 corresponds to the drive given a hidden setting in S120 described above. Therefore, in S545 the drive letter is not displayed in the Explorer 277, but is recognized internally.

The process in S315 of FIG. 9 ends after completing the process for loading dynamic drivers described in FIG. 11. Next, in S320 the PC 12 loads a service process, and in S325 waits for login data.

Specifically, the PC 12 waits in S325 until the user has completed a login operation (S325: not logged in). After the user has completed the login process (S325: logged in), in S330 the PC 12 launches autostart programs. The process in S330 will be described next in greater detail with reference to FIG. 12.

Figure 12:
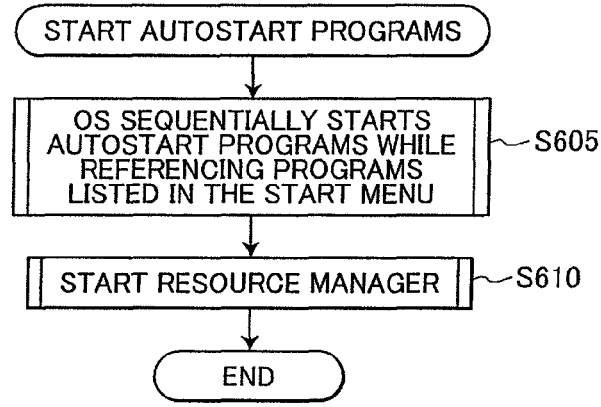
FIG. 12 is a flowchart illustrating steps in a process executed on the PC for starting autostart programs.

Specifically, in S605 of FIG. 12, the OS of the PC 12 sequentially launches autostart programs while referencing programs listed in the Start Up in the Start Menu. In S610 the PC 12 launches the resource manager 241. Details of the process executed by the resource manager 241 after the resource manager 241 is started in S610 will be described later in greater detail.

After completing S330 in FIG. 9 by launching the autostart programs in the process of FIG. 12, in S355 the PC 12 enters a normal state. Once the PC 12 has arrived at this normal state, the user can use the printer application 271, scanner application 273, PC-FAX application 275, Explorer 277, and the like as desired.

If the user subsequently performs an operation to log out or to shutdown the PC 12 (S335: log out or shutdown), in S340 the PC 12 first stops all the programs started automatically and manually and, in the case of a logout operation (S340: logout), returns to S325.

However, in the case of a shutdown operation (S340: shutdown), in S345 the PC 12 unloads the service process, in S350 unloads the dynamic drivers, and in S355 unloads the static drivers. Lastly, in S360 the PC 12 unloads the OS and shuts off the power to the PC 12. The process in S345-S360 unloads all software in the reverse order of the process in S305-S320.

Process Executed by the Resource Manager

Figure 14:
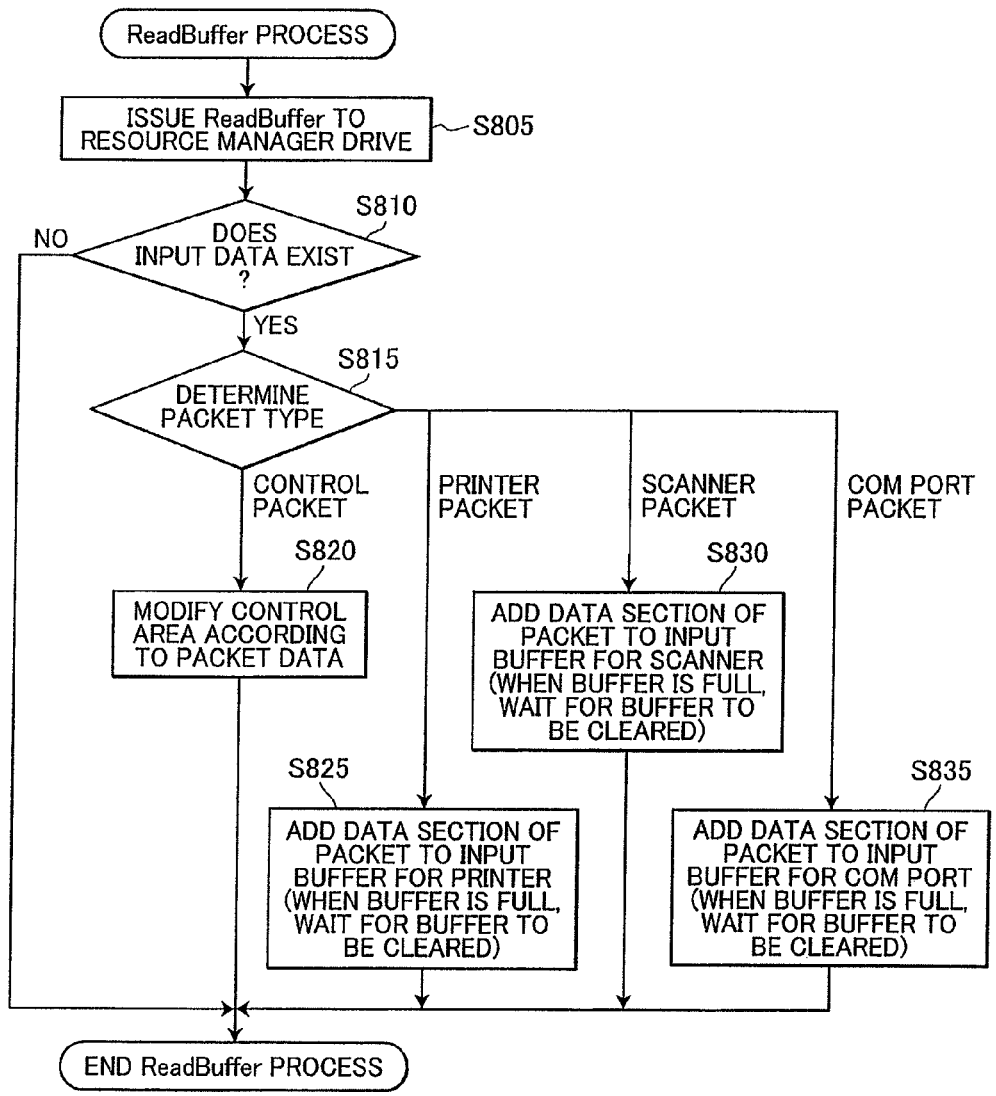
FIG. 14 is a flowchart illustrating steps in a ReadBuffer process executed on the PC.
Figure 15:
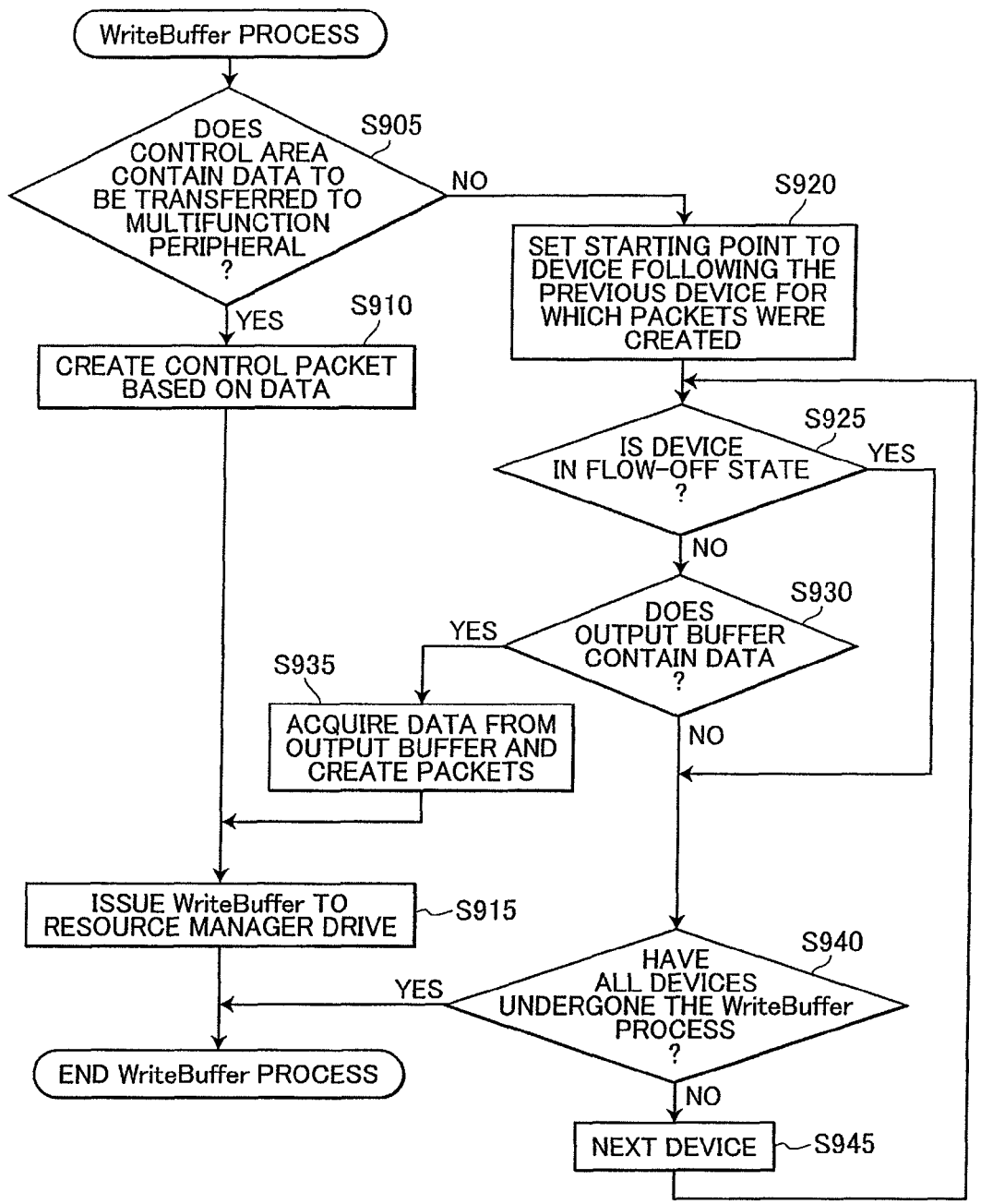
FIG. 15 is a flowchart illustrating steps in a WriteBuffer process executed on the PC.

Next, a process executed by the resource manager 241 after the resource manager 241 is started in S610 will be described with reference to FIGS. 13 through 15. This process is executed by the CPU 12a provided in the PC 12 shown in FIG. 1.

After the resource manager 241 is started, in S705 the resource manager 241 (more precisely the PC 12 executing a process to function as the resource manager 241; however, the resource manager 241 is used in this description) reads the model name of the targeted multifunction peripheral 11 and other settings from the INI file. In the process of S705 the resource manager 241 reads the various data that was stored in the INI file in S125 and the like described above.

In S710 the resource manager 241 searches for the drive for the resource manager of the multifunction peripheral 11. Since this process is identical to that described above with reference to FIG. 8, a description of the process in S710 will not be repeated here.

If the resource manager drive was not found in 3710 (S710: not found), then in S715 the PC 12 displays a dialog box for the user with the message "Please wait while a USB connection is established with the multifunction peripheral 11, then press OK."

In S715 the PC 12 waits for input from the user. Here, the user can perform an operation to select (click on) "OK" or "Cancel" in the dialog box displayed on the display unit of the PC 12.

If the user has selected "Cancel" (S715: Cancel), the process performed by the resource manager 241 ends. However, if the user has selected "OK" (S715: OK), then the PC 12 repeats the process from S710.

If the resource manager drive was found in S710 (S710: found), then in S720 the PC 12 waits for a prescribed time and in S725 determines whether an end request has been received.

If an end request was not received (S725: NO), then in S730 the resource manager 241 performs a ReadBuffer process in S730 and a WriteBuffer process in S735 and subsequently returns to S720. Accordingly, the resource manager 241 repeatedly performs the process in S720-S735 while an end request has not been received. If an end request is received (S725: YES), the process performed by the resource manager 241 ends.

The ReadBuffer process of S730 executed during the loop of S720-S735 functions to acquire input data transferred from the multifunction peripheral 11 to the resource manager 241. The WriteBuffer process of S735 performed during the same loop functions to transmit output data from the resource manager 241 to the multifunction peripheral 11.

ReadBuffer Process

Next, the ReadBuffer process of S730 will be described with reference to FIG. 14.

In S805 at the beginning of the ReadBuffer process, the resource manager 241 issues the SCSI command "Read-Buffer" to the resource manager drive. In S810 the resource manager 241 determines whether input data was acquired in S805.

If input data was not acquired (S810: NO), then the resource manager 241 ends the ReadBuffer process. However, if input data was acquired (S810: YES), in S815 the resource manager 241 determines the type of packet received.

The type of input data that the multifunction peripheral 11 returns in response to a "ReadBuffer" command is dependent on the specifications of the multifunction peripheral 11. In the embodiment, the multifunction peripheral 11 returns one of a control packet, printer packet, scanner packet, and COM port packet.

Information indicating which type of these packets is returned and information making up the actual data is data of a unique standard in the embodiment. The multifunction peripheral 11 stores, as vendor-specific data, the unique standard data in the actual data section of packets having a data structure conforming to the SCSI standard and transfers these packets to the PC 12.

Therefore, in S815 the resource manager 241 acquires the vendor-specific data from the actual data section in the packets acquired as SCSI standard data, determines whether the type of packets are control packets, printer packets, scanner packets, or COM port packets based on the vendor-specific data.

If the packets are control packets (S815: control packets), in S820 the resource manager 241 modifies the control area 291 (see FIG. 6) based on the packet data and subsequently ends the ReadBuffer process.

If the packets are printer packets (S815: printer packets), in S825 the resource manager 241 adds the data section of the packets to the input buffer 293 and subsequently ends the ReadBuffer process. If the input buffer 293 is full at this time, then the resource manager 241 waits until the input buffer 293 is empty before performing the process in S825.

If the packets are scanner packets (S815: scanner packets), in S830 the resource manager 241 adds the data section of the packets to the input buffer 295 and subsequently ends the ReadBuffer process. If the input buffer 295 is full at this time, the resource manager 241 waits until the input buffer 295 is empty before performing the process in S830.

If the packets are COM port packets (S815: COM port packets), in S835 the resource manager 241 adds the data section of the packets to the input buffer 297 and subsequently ends the ReadBuffer. If the input buffer 297 is full at this time, the resource manager 241 waits until the input buffer 297 is empty before performing the process in S835.

WriteBuffer Process

Next, the WriteBuffer process of S735 will be described with reference to FIG. 15.

In S905 at the beginning of the WriteBuffer process, the resource manager 241 determine whether the control area 291 contains data to be transferred to the multifunction peripheral 11.

If the control area 291 contains data to be transferred (S905: YES), then in S910 the resource manager 241 creates a control packet based on the data to be transferred. In S915 the resource manager 241 issues the SCSI command "Write-Buffer" to the resource manager drive and subsequently ends the WriteBuffer process.

Specifications of the multifunction peripheral 11 determine how the multifunction peripheral 11 treats output data transferred from the PC 12 when a WriteBuffer command has been issued. In S910 of the embodiment, the resource manager 241 prepares information indicating that the packets are control packets and information for the actual data in conformance with the unique standard, and stores this information (information indicating that the packets are control packets and information for the actual data) as vendor-specific data in the actual data section of the packets configured of a data structure conforming to the SCSI standard. In S915 this data is transferred from the PC 12 to the multifunction peripheral 11.

However, if the control area 291 does not contain data to be transferred to the multifunction peripheral 11 (S905: NO), then in S920 the resource manager 241 sets the starting point for selecting a processing target to the device following the device for which packets were previously created.

The device for which packets were previously created indicates the device to which packets were transmitted when the WriteBuffer process was previously performed. In the embodiment, the devices that can be set as the transmission target include the printer, scanner, and modem (PC-FAX).

More specifically, if the device for which packets were previously created is the printer, then in S920 the resource manager 241 sets the scanner, which is the device following the printer, as the starting point for selecting a processing target. If the device for which packets were previously created is the scanner, then in S920 the resource manager 241 sets the modem (PC-FAX), which follows the scanner, as the starting point for selecting a processing target. If the device for which packets were previously created is the modem (PC-FAX), then in S920 the resource manager 241 sets the printer, which follows the modem, as the starting point for selecting the processing target.

After selecting a processing target above, in S925 the resource manager 241 determines whether the device set as the processing target (printer, scanner, or modem) is in a flow-off state.

The resource manager 241 determines that the device set as the processing target is not in a flow-off state (S925: NO) if data processing on the device has progressed sufficiently. In this case, in S930 the resource manager 241 determines whether the output buffer contains data.

Specifically, if the device targeted for processing is the printer, then in S930 the resource manager 241 determines whether the output buffer 292 corresponding to the printer contains data. Similarly, the resource manager 241 determines whether the output buffer 294 corresponding to the scanner contains data, if the targeted device is the scanner, and whether the output buffer 296 corresponding to the modem contains data if the targeted device is the modem.

If the corresponding output buffer contains data (S930: YES), then in S935 the resource manager 241 extracts data from the output buffer and creates packets.

As in the process of S910 described above, in the process of S935 the resource manager 241 prepares information indicating which device the packets correspond to and information configuring the actual data in conformance with the unique standard. The resource manager 241 stores this data (information indicating which device the packets correspond to and information configuring the actual data) as vendor-specific data in the actual data section of the packets having a data structure conforming to the SCSI standard.

After completing the process of S935, the resource manager 241 advances to S915 described above. As a result, the PC 12 transfers the data created in S935 to the multifunction peripheral 11.

However, if the output buffer does not contain data in S930 (S930: NO) or if the device is in a flow-off state in S925 (S925: YES), then the resource manager 241 advances to S940.

In S940 the resource manager 241 determines whether the output buffers for all devices that can be selected as a processing target have been checked in the current WriteBuffer process. More specifically, the resource manager 241 determines in S940 whether the process from S925 has been executed once for all devices that can be set as the processing target (printer, scanner, and modem).

The resource manager 241 reaches a NO determination in S940 if there remains any devices for which the process from S925 has not been executed and reaches a YES determination if the process from S925 has been executed once for all devices.

If devices remain to be processed (S940: NO), then in S945 the resource manager 241 selects the next device as the processing target and returns to S925. If all devices have been processed (S940: YES), the WriteBuffer process ends.

In the WriteBuffer process described above, the resource manager 241 performs the process in S930 after first completing the process in S905. By performing the processes in this sequence, the resource manager 241 always determines whether the control area 291 contains data to be transferred to the multifunction peripheral 11. When such data does not exist, the resource manager 241 determines whether one of the output buffers 292, 294, and 296 contains data.

Therefore, if the control area 291 contains data to be transferred to the multifunction peripheral 11, the resource manager 241 can transfer the data in the control area 291 to the multifunction peripheral 11, regardless of whether the output buffers 292, 294, and 296 contain data, thereby giving priority to data contained in the control area 291. In this way, control data can be quickly transferred to the multifunction peripheral 11 without being delayed by the transfer of data from the output buffers 292, 294, and 296, thereby achieving appropriate control.

Process Executed with the SCSI Command Analysis Task

Figure 16:
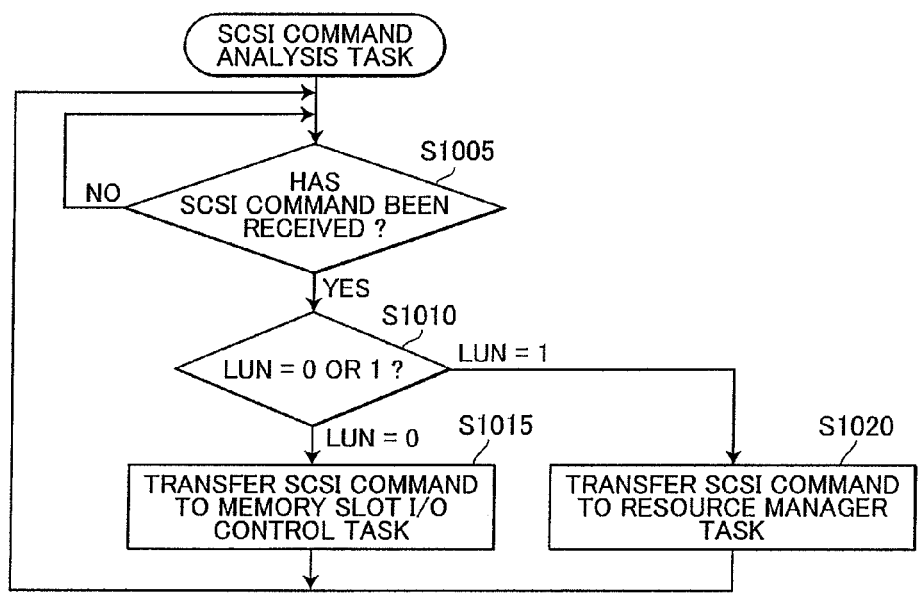
FIG. 16 is a flowchart illustrating steps in a process executed with a SCSI command analysis task implemented on the multifunction peripheral.

Next, the process executed by the SCSI command analysis task 111 provided in the multifunction peripheral 11 will be described with reference to FIG. 16. This process is executed by the CPU 11a provided in the multifunction peripheral 11 shown in FIG. 1.

In S1005 at the beginning of this process, the multifunction peripheral 11 waits for a SCSI command. The multifunction peripheral 11 repeatedly loops back to S1005 while a SCSI command has not been received from the PC 12 (S1005: NO).

When a SCSI command is transferred from the PC 12 (S1005: YES), in S1010 the multifunction peripheral 11 determines whether the LUN specified in the SCSI command is "0" or "1". If the LUN is "0" (S1010: LUN=0), then in S1015 the multifunction peripheral 11 redirects the SCSI command to the memory slot I/O control task 121, and subsequently returns to S1005.

If the LUN is "1" (S1010: LUN=1), then in S1020 the multifunction peripheral 11 redirects the SCSI command to the resource manager task 141 and subsequently returns to S1005.

Through the process executed on the SCSI command analysis task 111 described above, the multifunction peripheral 11 can direct SCSI commands transferred from the PC 12 to either the memory slot I/O control task 121 or the resource manager task 141 based on the LUN. Thereafter, a data process is performed on the memory slot I/O control task 121 or resource manager task 141.

The data process performed on the memory slot I/O control task 121 is similar to the process executed by a USB device well known in the art having a card reader function. Since this process does not differ from the conventional process, a description of the process has been omitted.

The data process performed on the resource manager task 141 is entirely different from the process executed by a USB device well known in the art having a card reader function. Specifically, the multifunction peripheral 11 performs a process to analyze the vendor-specific data transferred from the resource manager 241 and directs this data to one of the printer function, scanner function, and PC-FAX function.

Specifically, the multifunction peripheral 11 forces the OS of the PC 12 to recognize the card reader device in the multifunction peripheral 11 as two drives and specifies which drive the PC 12 is accessing based on the LUN. However, when LUN1 is specified, a process equivalent to that performed by a USB device having a card reader function is not executed in the resource manager task 141.

Accordingly, the process performed with the resource manager task 141 of the multifunction peripheral 11 will be described in greater detail below.

Process Executed with the Resource Manager Task

Figure 17:
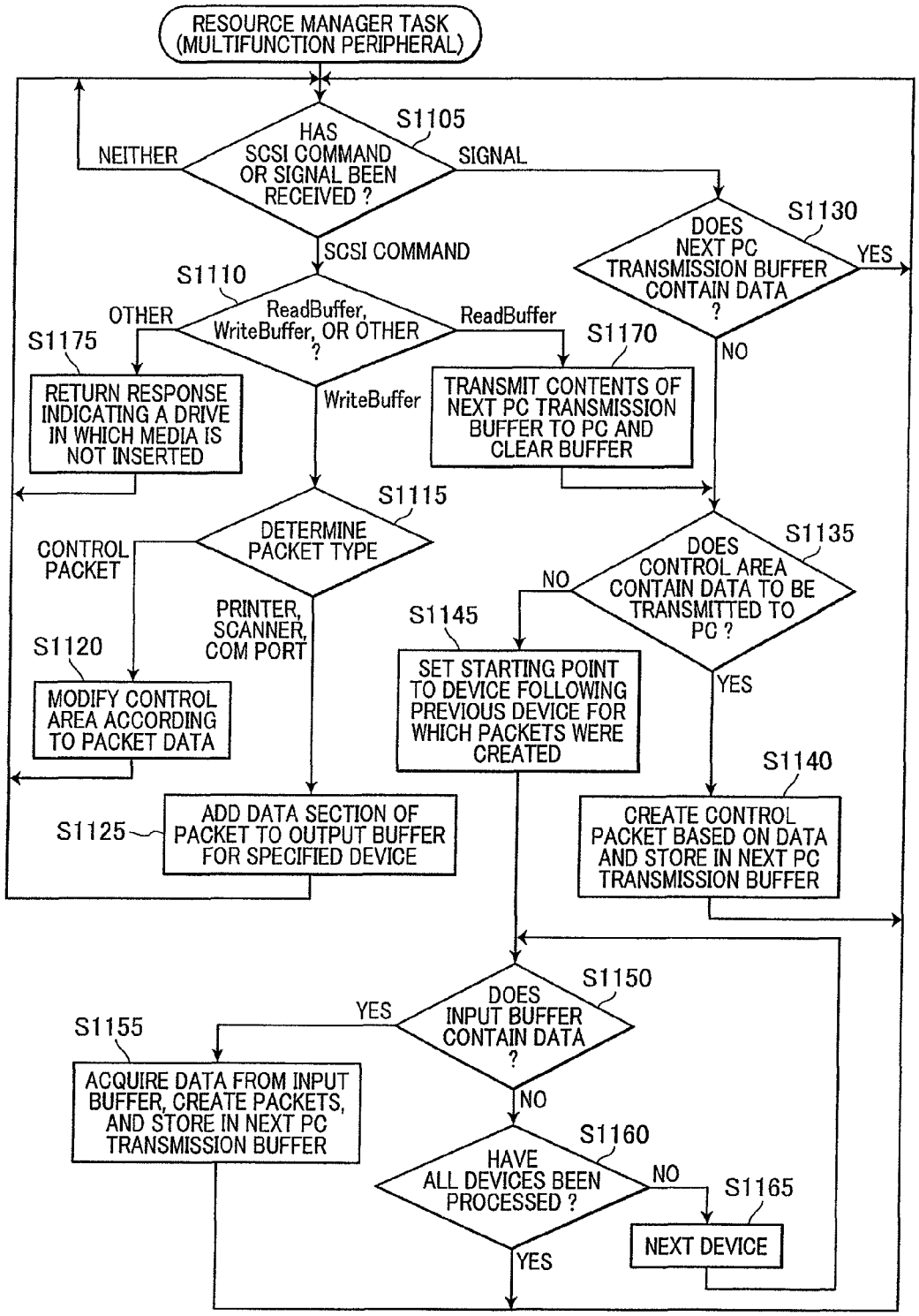
FIG. 17 is a flowchart illustrating steps in a process executed with a resource manager task implemented on the multifunction peripheral.

FIG. 17 is a flowchart illustrating steps in a process executed with the resource manager task 141 (more specifically the CPU 11a shown in FIG. 1) of the multifunction peripheral 11.

At the beginning of this process in S1105 of FIG. 17, the multifunction peripheral 11 waits for a SCSI command or signal. If neither the SCSI command nor signal has arrived (S1105: neither), the multifunction peripheral 11 returns to S1105 and continues to wait until either a SCSI command or signal is received.

While the multifunction peripheral 11 is waiting in this state, the PC 12 may transfer a SCSI command to the multifunction peripheral 11. For example when executing the process in S915 described above, the PC 12 transfers the SCSI command "WriteBuffer" to the resource manager drive of the multifunction peripheral 11.

When a SCSI command is received (S1105: SCSI command), in S1110 the multifunction peripheral 11 determines whether the SCSI command is "ReadBuffer," "WriteBuffer," or another command.

Since the SCSI command is "WriteBuffer" when the PC 12 executes the process in S915 (S1110: WriteBuffer), in S1115 the multifunction peripheral 11 determines the type of packets.

If the packets are control packets (S1115: control packets), in S1120 the multifunction peripheral 11 modifies the control area 181 according to data in the packets and returns to S1105. It is noted that in the process of S1115, the resource manager task 141 determines that the packets are control packets based on the vendor-specific data in the actual data section of the packets.

However, if the packets are printer packets, scanner packets, or COM port packets (S115: printer, scanner, or COM port), in S1125 the multifunction peripheral 11 adds the data section of the packets to the output buffer of the specified device. It is noted that in the process of S1115, the resource manager task 141 determines which device the packets correspond to, based on the vendor-specific data in the actual data section of the packets.

More specifically, if the packets are printer packets, the multifunction peripheral 11 adds the data section of the packets to the output buffer 182 of the printer. As a result, the output data is transferred to the printer I/O task 151 via the output buffer 182, relayed to the printer control task 161, and processed under the control of the printer hardware 171. However, since the control process is well known in the art, a description of this process has been omitted.

If the packets are scanner packets, the multifunction peripheral 11 adds the data section of the packets to the output buffer 184. As a result, the output data is transferred to the scanner I/O task 153 via the output buffer 184, relayed to the scanner control task 163, and processed under the control of the scanner hardware 173. Since this control process is identical to that of a scanner well known in the art, a description of the process has been omitted.

If the packets are COM port packets, the multifunction peripheral 11 adds the data section of the packets to the output buffer 186. As a result, the output data is transferred to the PC-FAX I/O task 155 via the output buffer 186, relayed to the modem control task 165, and processed under the control of the modem hardware 175. Since this control process is identical to that of a conventional FAX modem, a description of this process has been omitted.

Hence, when output data arrives from the PC 12, the multifunction peripheral 11 implements a printer function, scanner function, or PC-FAX function through the processes in S1110-S1125 described above. In some cases, the implemented function generates input data to be transferred to the PC 12.

As a specific example, when a command for using the scanner function is received from the PC 12, the multifunction peripheral 11 implements the scanner function, producing scan data as input data to be transferred to the PC 12. Other examples of input data for the PC 12 include reception data received with the PC-FAX function, and error data generated when an error occurs while using the printer function.

When this input data is generated, the printer I/O task 151, scanner I/O task 153, or PC-FAX I/O task 155 stores the input data in the respective input buffers 183, 185, and 187 and subsequently transmits a signal to the resource manager task 141.

When this type of signal is transmitted to the resource manager task 141 (S1105: signal), in S1130 the multifunction peripheral 11 determines whether the next PC transmission buffer 191 contains data.

If the next PC transmission buffer 191 does not contain data (S1130: NO), then in S1135 the multifunction peripheral 11 determines whether the control area 181 contains data to be transferred to the PC 12. If the control area 181 contains data to be transferred to the PC 12 (S1135: YES), then in S1140 the multifunction peripheral 11 generates a control packet based on the data to be transferred and stores the packet in the next PC transmission buffer 191. When generating the packets, in the process of S1140, the resource manager task 141 prepares information indicating that the packets are control packets and information for the actual data in conformance with the unique standard, and stores this information (information indicating that the packets are control packets and information for the actual data) as vendor-specific data in the actual data section of the packets configured of a data structure conforming to the SCSI standard. Subsequently, the multifunction peripheral 11 returns to S1105.

However, if the control area 181 does not contain data to be transferred to the PC 12 (S1135: NO), then in S1145 the multifunction peripheral 11 sets the starting point for selecting a processing target to the device following the device for which packets were previously created.

The device for which packets were previously created is the device set as the processing target in the previous process performed from S1145. In the embodiment, devices that can be set as the processing target include the printer, scanner, and modem (PC-FAX).

For example, if the device for which packets were previously created is the printer, in S1145 the multifunction peripheral 11 sets the starting point for selecting a processing target to the scanner, which is the next device. If the device for which packets were previously created is the scanner, in S1145 the multifunction peripheral 11 sets the starting point for selecting a processing target to the modem, which is the next device. If the device for which packets were previously created is the modem (PC-FAX), then in S1145 the multifunction peripheral 11 sets the starting point for selecting a processing target to the printer, which is the next device.

After selecting a processing target in S1145, in S1150 the multifunction peripheral 11 determines whether the input buffer corresponding to the device set as the processing target contains data. For example, the multifunction peripheral 11 determines whether the input buffer 183 contains data if the device set as the processing target is the printer, whether the input buffer 185 contains data if the device set as the processing target is the scanner, and whether the input buffer 187 contains data if the device set as the processing target is the modem (PC-FAX).

If the input buffer corresponding to the processing target contains data (S1150: YES), in S1155 the multifunction peripheral 11 extracts data from the input buffer, generates packets from this data, and stores these packets in the next PC transmission buffer 191. Subsequently, the multifunction peripheral 11 returns to S1105.

In the process of S1155, when generating the packets, the resource manager task 141 prepares information indicating which device the packets correspond to and information configuring the actual data in conformance with the unique standard. The resource manager task 141 stores this data (information indicating which device the packets correspond to and information configuring the actual data) as vendor-specific data in the actual data section of the packets having a data structure conforming to the SCSI standard.

However, if the input buffer corresponding to the processing target does not contain data (S1150: NO), then in S1160 the multifunction peripheral 11 determines whether all devices that can be set as the processing target have undergone the process from S1145. Specifically, the multifunction peripheral 11 determines in S1160 whether the process from S1150 has been executed once for each of the device that can be selected as the processing target (printer, scanner, and modem).

The multifunction peripheral 11 reaches a NO determination if there remains device for which the process beginning in S1150 has not been executed, and reaches a YES determination if the process beginning from S1150 has been executed for all devices.

If not all devices have been processed (S1600: NO), then in S1165 the multifunction peripheral 11 selects the next device as the processing target and returns to S1150. However, if all of the devices have been processed (S1160: YES), the multifunction peripheral 11 returns to S1105.

As described above, when a signal is transmitted to the resource manager task 141, the multifunction peripheral 11 stores data in the next PC transmission buffer 191 by executing the process from S1135. The data stored in the next PC transmission buffer 191 is subsequently transferred to the PC 12 when the PC 12 executes the process in S805 described above.

More specifically, when the PC 12 executes the process in S805, the PC 12 issues the SCSI command "ReadBuffer" for the resource manager drive and transmits the SCSI command to the multifunction peripheral 11.

Upon receiving the SCSI command "ReadBuffer" (S1110: ReadBuffer), in S1170 the multifunction peripheral 11 transfers the contents of the next PC transmission buffer 191 to the PC 12 and subsequently clears the next PC transmission buffer 191, at which point the next PC transmission buffer 191 is free. Subsequently, the multifunction peripheral 11 advances to 1135.

After executing the process in S1135 described above, when advancing to S1155 the multifunction peripheral 11 extracts data from the input buffer, creates packets from the extracted data, and stores these packets in the next PC transmission buffer 191.

If the next PC transmission buffer 191 contains data (S1130: YES) when a signal is transmitted to the resource manager task 141, the multifunction peripheral 11 cannot store data from an input buffer or the like in the next PC transmission buffer 191. In this case, the multifunction peripheral 11 returns to S1105, leaving the input data in the input buffer or the like.

However, after the multifunction peripheral 11 transmits the contents of the next PC transmission buffer 191 to the PC 12 and clears the next PC transmission buffer 191 in S1170, the multifunction peripheral 11 subsequently advances to S1135 described above. At this point, input data that could not be stored in the next PC transmission buffer 191 when the signal is received is transferred to the next PC transmission buffer 191.

Further, all SCSI commands transferred from the resource manager 241 of the PC 12 to the resource manager task 141 are either "ReadBuffer" or "WriteBuffer" commands, but in some cases a SCSI command may arrive via the file system 233 or removable disk driver 223.

When this type of SCSI command is received (S1110: other), in S1175 the multifunction peripheral 11 returns a response indicating a drive in which media is never mounted, and subsequently returns to S1105.

In this way, the multifunction peripheral 11 can simply return a response indicating a drive in which media is never inserted, without having to return a more complex response emulating a request to write to media or a request to read from media. Further, by emulating a state in which medias is never inserted, the multifunction peripheral 11 also does not generate a media replacement status, thereby reducing the likelihood of the multifunction peripheral 11 becoming caught in an unpredictable state.

In the process described above, S1150 is performed after S1135. By performing steps in this order, the multifunction peripheral 11 always gives priority to data in the control area 181 to be transferred to the PC 12. If this data does not exist, then the multifunction peripheral 11 determines whether data is stored in one of the input buffers 183, 185, and 187.

Hence, if the control area 181 contains data to be transferred to the PC 12, the multifunction peripheral 11 gives priority to transferring this data in the control area 181 to the PC 12, regardless of whether the input buffers 183, 185, and 187 contain data. Accordingly, the multifunction peripheral 11 can promptly transfer control data to the PC 12, enabling suitable control to be achieved without interference when transferring data from the input buffers 183, 185, and 187.

EFFECTS OF THE FIRST EMBODIMENT

With the first embodiment described above, the multifunction peripheral 11 forces the OS of the PC 12 to recognize all of the printer function, scanner function, and PC-FAX function as a logic unit equivalent to a removable disk of a USB storage device.

Therefore, data can be transferred between the PC 12 and the logic unit according to the USB communication protocol simply by preparing one each of input and output endpoints for the logic unit. Moreover, the PC 12 can use the printer function, scanner function, and PC-FAX function by transferring data.

Hence, unlike a USB compound device having logic units configured for each of the printer function, scanner function, and PC-FAX function, the multifunction peripheral 11 need only prepare one each of an input endpoint and output endpoint for all of these functions, thereby reducing the number of endpoints required.

Further, data for controlling any of the printer function, scanner function, and PC-FAX function are stored as vendor-specific data in the actual data section of data that can be transferred according to USB protocol. Therefore, the OS of the PC 12 can access the logic unit corresponding to the removable disk at any time, without requiring a pseudo condition in which one USB device must be disconnected before establishing a connection with another USB device. Hence, the OS of the PC 12 can simultaneously use the plurality of functions without requiring time to switch device drivers.

Further, since the endpoint for control transfers (EP0) is not used for transferring other data, required control can be promptly implemented without interference from other data transfers, even when a large amount of data is being transferred.

Further, the multifunction peripheral 11 described above forces the OS of the PC 12 to recognize the multifunction peripheral 11 as a USB device having a plurality of LUNs, with one of the logic units corresponding to the printer function, scanner function, and PC-FAX function and another logic unit corresponding to a card reader function.

Hence, the PC 12 can control the card reader function through a standard OS device driver, without needing to incorporate the card reader function as part of the logic unit for the printer function, scanner function, and PC-FAX function. Moreover, providing the card reader function does not interfere with the original objective of reducing the number of endpoints since it is not necessary to increase the number of endpoints for the card reader function.

The resource manager 241 is provided between the OS and the printer port driver 251, and executes data transfers between the two. So, the printer port driver 251 can be made equivalent to a device driver for controlling a device of a single printing function. The resource manager 241 is provided between the OS and the scanner driver 253, and executes data transfers between the two. So, the scanner driver 253 can be made equivalent to a device driver for controlling a device of a single scanning function. The resource manager 241 is provided between the OS and the COM port driver 255, and executes data transfers between the two. So, the COM port driver 255 can be made equivalent to a device driver for controlling a device of a single PC-FAX function. Hence, it is unnecessary to provide a special device driver capable of controlling all of the printing function, scanning function, PC-FAX function, thereby suppressing the cost for developing the device drivers.

(2) SECOND EMBODIMENT

Next, a second embodiment of the present invention will be described. Since the structure of the second embodiment differs only in part from the first embodiment described above, the following description will focus primarily on the differences from the first embodiment, while a description of the shared structure will be omitted.

Process for Installing Multifunction Peripheral Software

Next, a process for installing multifunction peripheral software on the PC 12 according to the second embodiment will be described with reference to the flowchart in FIG. 18. The process in FIG. 18 is executed by the PC 12 in place of the process shown in FIG. 7.

Figure 18:
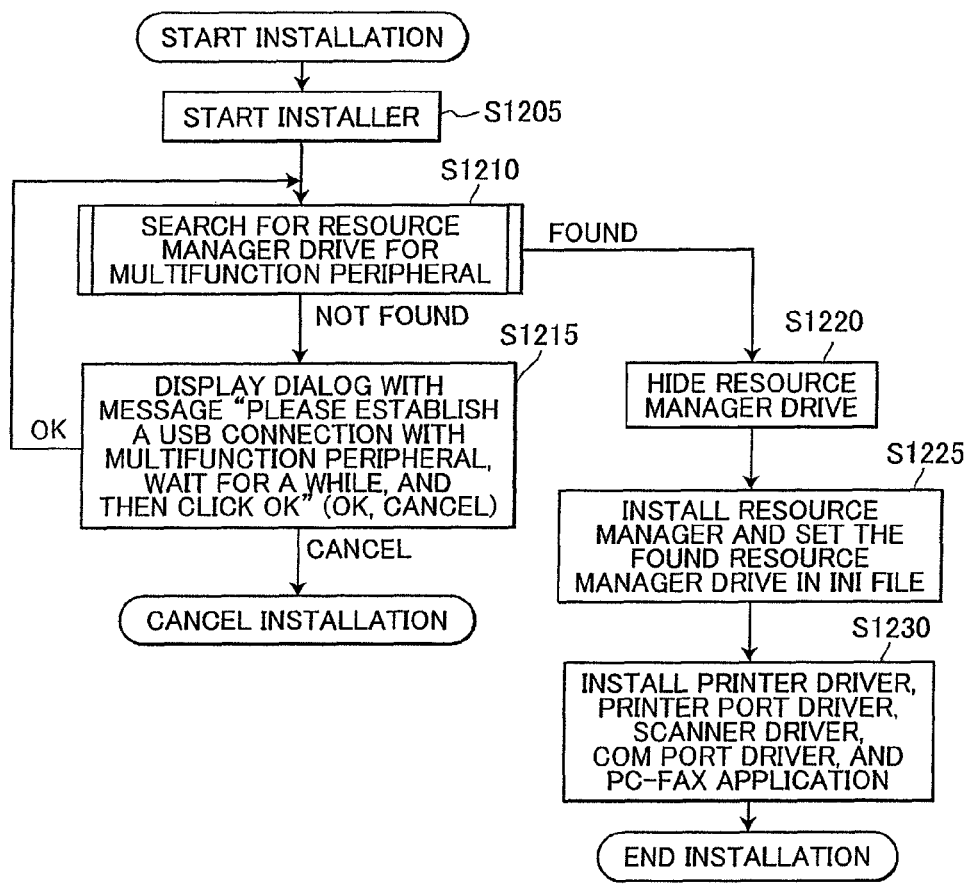
FIG. 18 is a flowchart illustrating steps in an installation process executed by the PC for installing multifunction peripheral software according to a second embodiment.

In the process of FIG. 18 described below, S1205-S1220 are identical to S105-S1220 according to the first embodiment and will be only briefly described below. Specifically, in S1205 at the beginning of the process in FIG. 18, the PC 12 launches the installer. In S1210 the PC 12 searches for the resource manager drive for the multifunction peripheral 11. Details of the process in S1210 are shown in FIG. 8 described in the first embodiment. Therefore, a detailed description of this process will be omitted here.

If a resource manager drive was not found in the process of S1210 (S1210: not found), in S1215 the PC 12 displays a dialog box for the user with the message "Please wait while a USB connection is being established with the multifunction peripheral 11, then click OK."

If the user selects "Cancel" at this time (S1215: Cancel), the PC 12 cancels the installation process. However, if the user selects "OK" (S1215: OK), then the PC 12 repeats the process from S1210.

On the other hand, if a resource manager drive is found in S1210 (S1210: found), then in S1220 the PC 12 hides the resource manager drive found in S1210.

In S1225 the PC 12 installs the resource manager and sets the found resource manager drive in the INI file. Specifically, the PC 12 according to the second embodiment stores the drive letter for the resource manager drive held by the variable CDRV (see FIG. 8) in the INI file rather than storing the model name of the multifunction peripheral acquired in S210 (see FIG. 8) in the INI file as described in the first embodiment.

In S1230 the PC 12 installs a printer driver, printer port driver, scanner driver, COM port driver, and PC-FAX application and subsequently ends the installation process. The process in S1230 is identical to that of S130 described in the first embodiment.

Process Executed by the Resource Manager

Next, the process executed by the resource manager 241 in the second embodiment will be described with reference to FIG. 19. This process is performed in place of the process according to the first embodiment shown in FIG. 13.

Once the resource manager 241 is started, in S1305 the resource manager 241 reads the resource manager drive setting from the INI file. In this process, the resource manager 241 reads various data that was stored in the INI file in S1225 and the like described above.

In S1310 the resource manager 241 confirms that the drive to which the drive letter for the resource manager drive read from the INI file was assigned is in fact a resource manager drive.

The process in S1310 is performed to ensure that the drive letter stored in the INI file matches the actual drive letter, since there is a possibility that the assignment of the drive letter was modified after the INI file was created.

If the drive corresponding to the drive letter recorded in the INI file is not a resource manager drive (S1310: NO), then in S1350 the PC 12 displays a dialog box for the user with the message "Please wait while a USB connection is established with the multifunction peripheral 11, then click OK."

In the process of S1315, the PC 12 waits for input from the user. At this time, the user can perform an operation in the dialog box displayed on the display unit of the PC 12 to select either "OK," "Cancel," or "Rescan."

If the user clicks on "Cancel" (S1315: Cancel), then the process of the resource manager 241 ends. If the user clicks "OK" (S1315: OK), the PC 12 returns to the process of S1310. If the user selects "Rescan" (S1315: Rescan), then in S1320 the resource manager 241 again searches for the resource manager drive of the multifunction peripheral 11.

The process in S1320 is identical to the process described above for FIG. 8, and a description of this process will not be repeated here. If the resource manager drive could not be found in S1320 (S1320: not found), then the PC 12 returns to S1315 and again waits for input from the user.

However, if the resource manager drive was found in S1320 (S1320: found), then in S1325 the PC 12 modifies the setting for the resource manager drive by writing the new drive letter found for the resource manager drive in the INI file. After completing the process in S1325, the PC 12 returns to S1305 and repeats the above process from the beginning as the resource manager 241.

When the drive letter for the resource manager drive read from the INI file corresponds to a resource manager in S1310 while executing the process of S1305-S1325 described above (S1310: YES), then in S1330 the PC 12 waits a prescribed time, and in S1335 determines whether an end request has been received.

If an end request has not been received (S1335: NO), then the resource manager 241 executes the ReadBuffer process in S1340 and the WriteBuffer process in S1345, and subsequently returns to S1330. In this way, the resource manager 241 repeatedly performs the process in S1330-S1345 while an end request has not been received.

Figure 13:
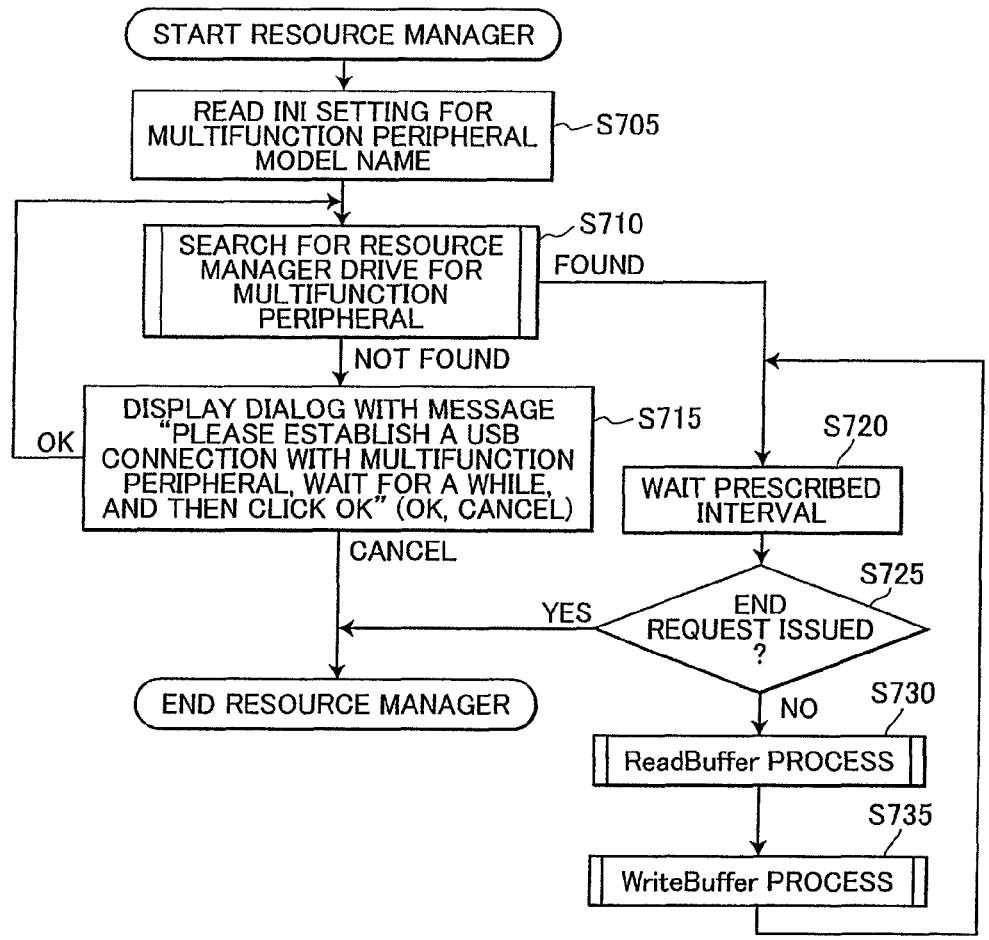
FIG. 13 is a flowchart illustrating steps in a process executed by a resource manager implemented on the PC.

The process of S1330-S1345 is identical to that of S720-S735 in FIG. 13 according to the first embodiment. Further, the process of S1340 is the same as that of FIG. 14, while the process of S1345 is the same as that of FIG. 15. Since these processes are identical to those in the first embodiment described above, a detailed description based on FIGS. 14 and 15 for the second embodiment will not be repeated.

EFFECTS OF THE SECOND EMBODIMENT

The multifunction peripheral 11 according to the second embodiment described above has the same operations and effects as the multifunction peripheral 11 according to the first embodiment.

Additionally, in the second embodiment described above, the PC 12 records the drive letter for the resource manager drive in an INI file in S1225 and subsequently in S1310 attempts to access the resource manager drive based on the drive letter recorded in the INI file.

Therefore, in the event that the drive letter recorded in the INI file does match the drive letter actually assigned to the resource manager drive, the PC 12 can detect the resource manager drive more quickly than through the scanning process in S710 of the first embodiment.

Further, if for some reason the PC 12 cannot quickly determine the correct resource manager drive in S1310, the PC 12 can scan for the resource manager drive in S1320, as described in the first embodiment. In other words, the second embodiment improves processing speed when the drive letter in the INI file is correct and maintains reliability if the drive letter in the INI file is incorrect.

3. THIRD EMBODIMENT

In a third embodiment of the present invention, the internal structure of the PC differs from that described in the first embodiment. Next, the internal structure of the PC according to the third embodiment will be described.

Internal Structure of the PC

Figure 20:
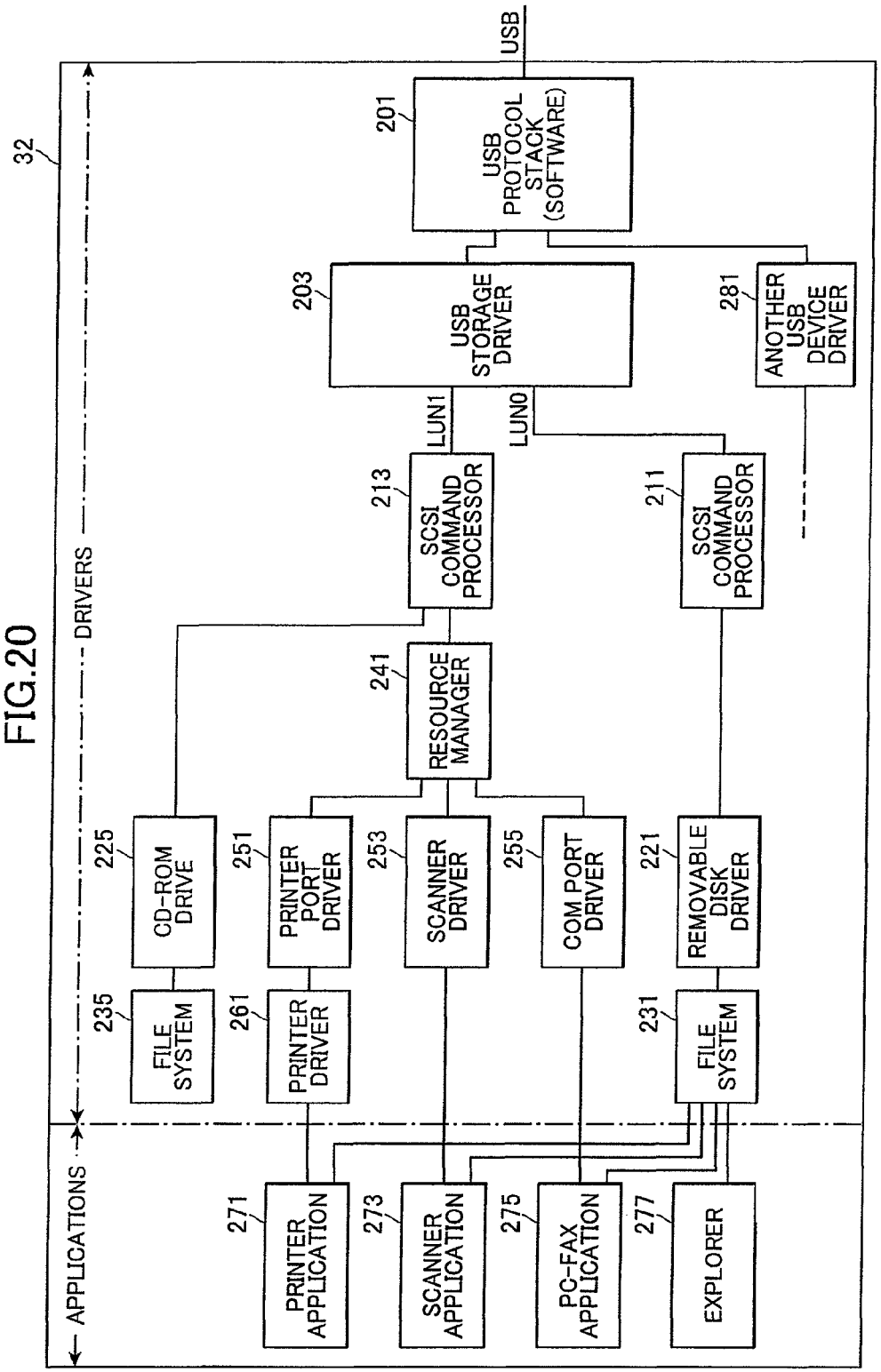
FIG. 20 is a block diagram showing the internal structure of a PC according to a third embodiment.

FIG. 20 is a block diagram showing the internal structure of a PC 32 according to the third embodiment. The PC 12 according to the first embodiment described above loads the removable disk driver 223 when the multifunction peripheral 11 returns the response "removable disk" for the LUN1 logic unit. However, the PC 32 according to the third embodiment differs on this point.

Specifically, in the third embodiment, the multifunction peripheral 11 returns the response "CD-ROM" for the LUN1 logic unit. Upon receiving this response, the PC 32 loads a CD-ROM driver 225 instead of the removable disk driver 223. The PC 32 links the LUN1 logic unit to a file system 235. This results in a drive letter being assigned to the LUN1 logic unit.

With this configuration, the OS of the PC 32 recognizes the logic unit LUN1 in the multifunction peripheral 11 as a device equivalent to a CD-ROM. Accordingly, there is no need to prepare individual endpoints for each of the printer function, scanner function, and PC-FAX function, thereby obtaining the same operations and effects as those in the first embodiment.

Further, in the third embodiment, the existence of the logic unit recognized by the OS of the PC 32 as a device equivalent to a CD-ROM can be hidden according to a method different from that in the first embodiment.

Specifically, in the first embodiment, in S545 (FIG. 11), after the PC 12 assigns a drive letter to the device recognized as a removable disk, the PC 12 hides the drive letter according to the display setting corresponding to this drive letter, which has been set in S120 by modifying the content of the registry.

However, the PC 32 according to the third embodiment can hide the existence of the logic unit recognized as a CD-ROM device simply by canceling the drive letter assignment in S120 (FIG. 7).

When the drive letter assignment is deleted, the PC 32 can no longer access the LUN1 logic unit using this drive letter. However, since the OS of the PC 32 recognizes the LUN1 logic unit as a device equivalent to a CD-ROM, the PC 32 can access the LUN1 logic unit without using the drive letter.

More specifically, the PC 32 can access the LUN1 logic unit by issuing a command to a device string different from the drive letter, such as "¥¥.¥cdrom1" or "¥¥.¥cdrom2". Therefore, the resource manager 241 can perform the same processes described in the first embodiment by issuing a SCSI command specifying this device string.

Further, the PC 12 according to the first embodiment scans for the resource manager drive in the process of FIG. 8 by targeting drive letters "A" through "Z". However, the PC 32 according to the third embodiment need only modify the search target from a drive letter to a device string set different from a drive letter and search for the resource manager drive using "¥¥.¥cdrom1" through "¥¥.¥cdrom16", for example.

While 16 device strings from "¥¥.¥cdrom1" through "¥¥.¥cdrom16" are set as the search target in this example, the number of device strings targeted for search is arbitrary.

Figure 19:
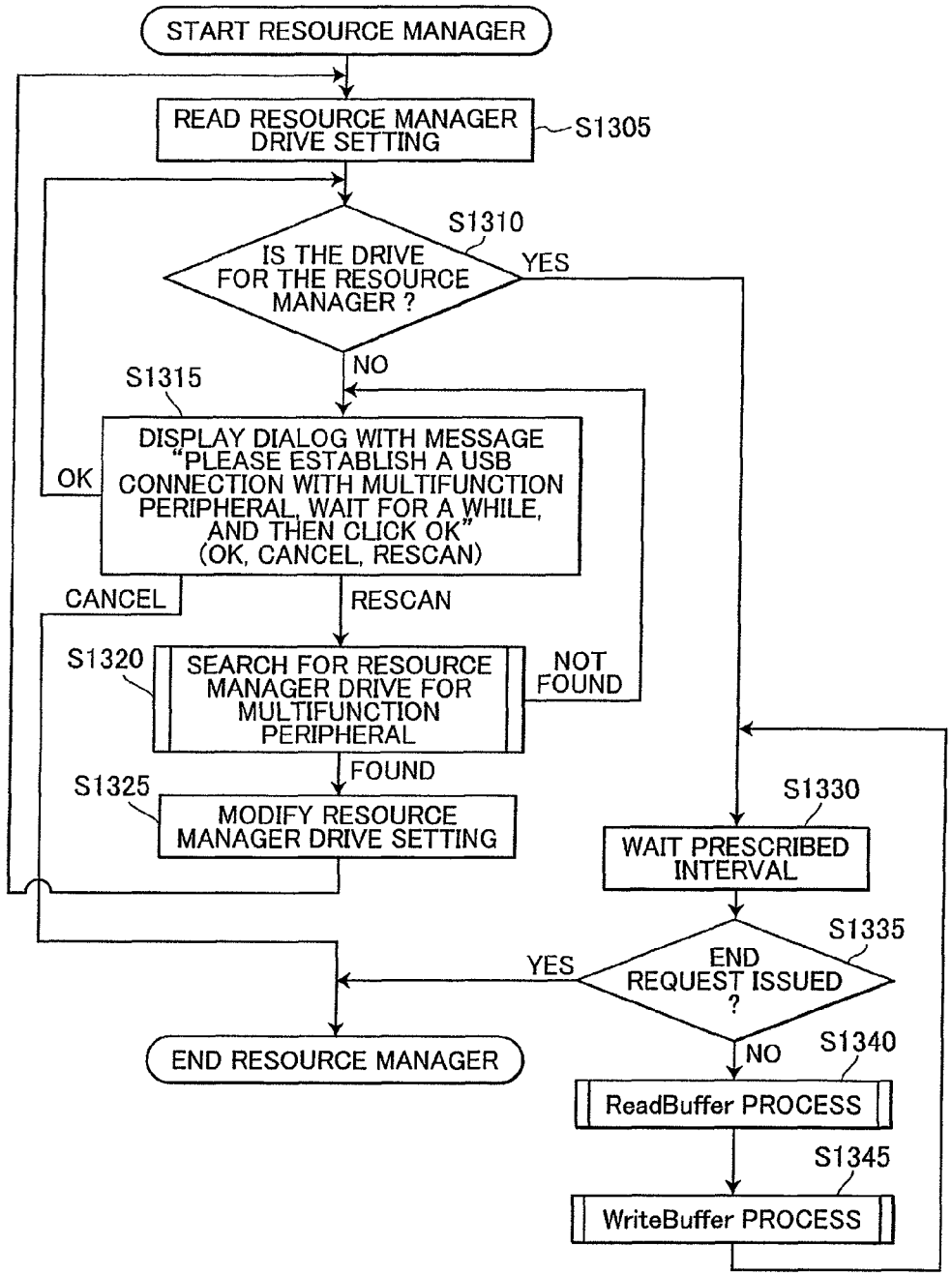
FIG. 19 is a flowchart illustrating steps in a process executed by a resource manager implemented on the PC according to the second embodiment.

Further, while the drive letter is recorded in an INI file in S1225 of FIG. 18 and used in S1310 of FIG. 19 in the second embodiment described above, a device string is recorded in the INI file and used in S1310 of FIG. 19 in the third embodiment.

EFFECTS OF THE THIRD EMBODIMENT

The third embodiment described above obtains the same operations and effects as those described in the first and second embodiments. Specifically, the multifunction peripheral 11 forces the OS of the PC 32 to recognize all of the printer function, scanner function, and PC-FAX function as a logic unit equivalent to a CD-ROM of a USB storage device. Therefore, it is not necessary to prepare an input and output endpoint for each individual function, reducing the number of required endpoints. The third embodiment attains the same advantages as the first and second embodiments.

Unlike the first and second embodiments described above, the logic unit corresponding to the printer function, scanner function, and PC-FAX function is recognized as a device equivalent to a CD-ROM. Hence, the PC 32 can easily hide the existence of this device emulating a CD-ROM device for the OS by deleting the drive letter assignment.

(4) FOURTH EMBODIMENT

In a fourth embodiment of the present invention, the internal structure of the PC differs from those in the first and third embodiments. Therefore, the internal structure of the PC according to the fourth embodiment will be described next.

Internal Structure of the PC

Figure 21:
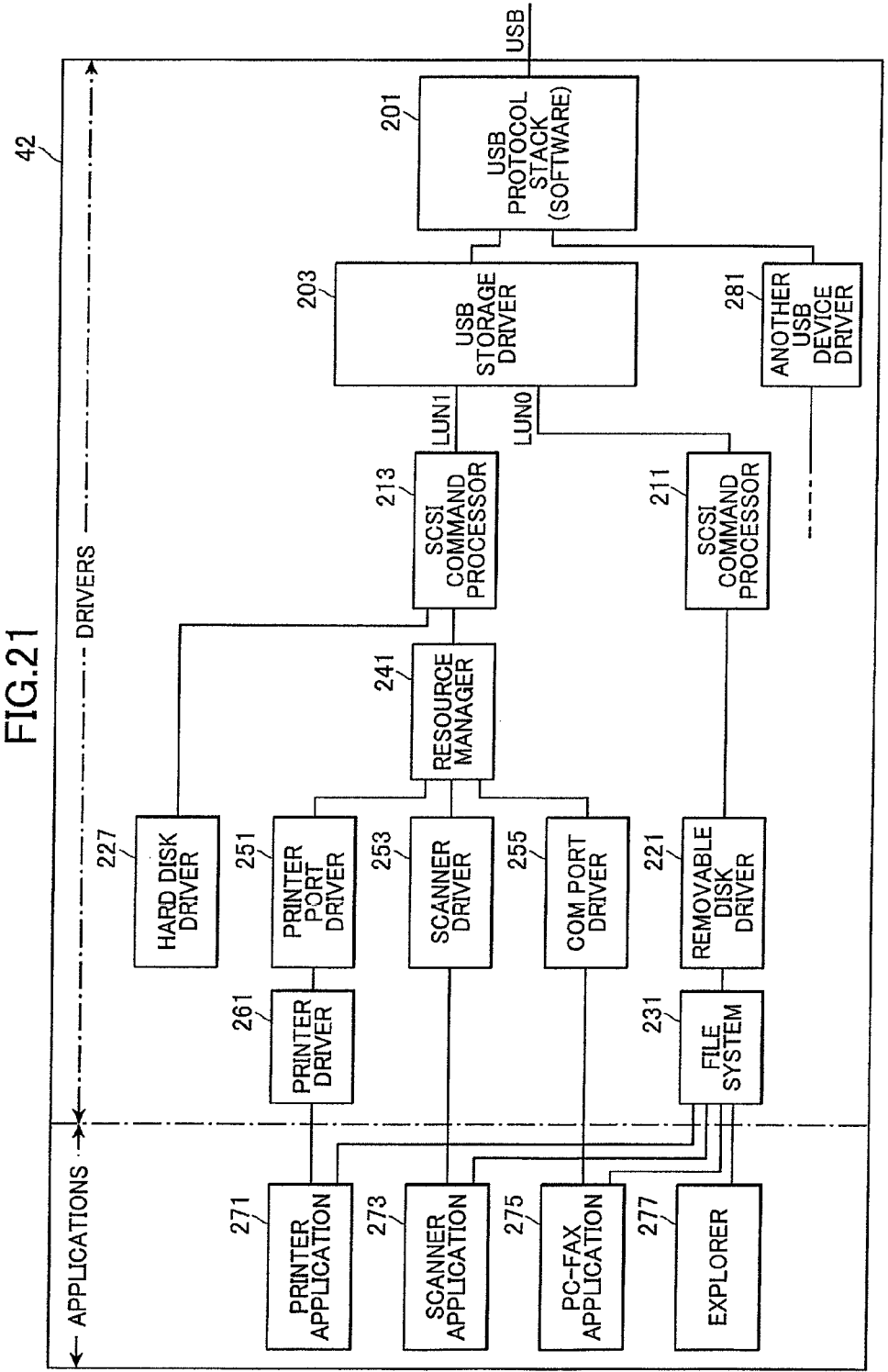
FIG. 21 is a block diagram showing the internal structure of a PC according to a fourth embodiment.

FIG. 21 is a block diagram showing the internal structure of a PC 42 according to the fourth embodiment. In the fourth embodiment, the multifunction peripheral 11 returns the response "hard disk" for the LUN1 logic unit. Upon receiving this response, the PC 42 loads a hard disk driver 227 instead of the removable disk driver 223.

Further, when the multifunction peripheral 11 receives a response request from the PC 42 for the LUN1 logic unit, the multifunction peripheral 11 emulates the response "Hard disk not partitioned." With this configuration, the OS of the PC 42 can recognize the logic unit LUN1 provided in the multifunction peripheral 11 as a device equivalent to a hard disk. Therefore, it is not necessary to prepare endpoints for each individual printer function, scanner function, and PC-FAX function and, hence, the fourth embodiment achieves the same operations and effects as those described in the first through third embodiments.

Further, the existence of a drive letter can be hidden since the OS of the PC 42 does not assign a drive letter to a hard disk that has not been partitioned.

EFFECTS OF THE FOURTH EMBODIMENT

The fourth embodiment described above has the same operations and effects as the first through third embodiments. Specifically, the multifunction peripheral 11 forces the OS of the PC 42 to recognize all of the printer function, scanner function, and PC-FAX function as a logic unit equivalent to a hard disk of a USB storage device. Accordingly, an input and output endpoint need not be prepared for each individual function, thereby reducing the number of required endpoints.

Unlike the first through third embodiments described above, the logic unit corresponding to the printer function, scanner function, and PC-FAX function is recognized as a device equivalent to a hard disk that has not been partitioned.

Since the OS does not assign a drive letter to such a device, the existence of the drive letter is easily hidden.

VARIATIONS OF THE EMBODIMENTS

While the invention has been described in detail with reference to the embodiments thereof, it would be apparent to those skilled in the art that various changes and modifications may be made therein without departing from the spirit of the invention.

For example, in the first embodiment, when an attempt is made to access the LUN1 logic unit provided in the multifunction peripheral 11 from a path different from that of the resource manager 241, the multifunction peripheral 11 returns a response in S1175 indicating a drive in which media is never mounted. However, the multifunction peripheral 11 may also return a response indicating a drive in which media is always mounted.

Since a media replacement status is not generated in this case, it is still possible to reduce the likelihood of an unexpected event more than when a media replacement status is generated. In other words, emulating a drive in which media is never inserted and emulating a drive in which media is always inserted are both methods of not producing a media replacement status.

While the multifunction peripheral 11 in the embodiments described above is a USB device having a plurality of LUNs, it is arbitral to have the plurality of LUNs. For example, while the portion of the USB device having a card reader function is recognized as the LUN0 logic unit in the embodiments, the multifunction device 11 can be configured to have only a single logic unit functioning as the portion of the USB device having a printer function, scanner function, and PC-FAX function when the card reader function is not needed. In this case, the PC need not recognize the USB device as having a plurality of LUNs.

Further, in the embodiments described above, the multifunction peripheral 11 functions as a USB storage class device in order to force the OS of the PC to recognize the multifunction peripheral 11 as a USB device having a plurality of LUNs. However, the multifunction peripheral 11 may also function as a USB device other than a USB storage class device when it is not necessary to be recognized as a USB device having a plurality of LUNs.

For example, the multifunction peripheral 11 may function as a USB compound device. In this case, endpoints are used for each of the plurality of functions recognized as the USB compound device.

However, it is possible to control a plurality of functions with a single set of endpoints in this case if at least one of the plurality of functions recognized as the USB compound device (more precisely, one function using a set of endpoints) functions as the compound logic unit described in the embodiments. Therefore, the overall number of endpoints used for the functions provided in the multifunction peripheral can be reduced.

In the above-described embodiments, the number of specific functions corresponding to the single compound logic unit is three (=printing function, scanner function, and PC-FAX function), but may be any number greater than 1. It is possible to suppress the number of endpoints used in the multifunction peripheral by increasing the number of specific functions for a single compound logic unit.

In the embodiments described above, the USB device corresponding to the compound logic unit emulates a removable disk, CD-ROM, or hard disk. However, the multifunction device may be configured to emulate another USB device, such as a flexible disk or a magneto-optical disc.

What is claimed is:

1. A multifunction device configured to perform a plurality of functions and configured to connect to a computer via a universal serial bus (USB) interface, the computer comprising an operating system (OS) installed thereon that recognizes the multifunction device as a device comprising a plurality of logic units, each logic unit of the plurality of logic units configured to transfer data according to a USB-compliant system, such that the computer uses the plurality of functions of the multifunction device by exchanging input/output data with the plurality of logic units, at least one logic unit of the plurality of logic units being a compound logic unit corresponding to two or more specific functions among the plurality of functions, the multifunction device comprising:

a controlling unit configured to determine which one of the two or more specific functions particular output data is for controlling, based on unique standard data comprised in an actual data section, when the computer has transferred the particular output data with the actual data section to the compound logic unit based on a Logical Unit Number (LUN) corresponding to the compound logic unit, wherein the controlling unit is configured to control the determined one function based on the particular output data, wherein the unique standard data is different from the LUN, wherein the controlling unit is configured to store unique standard data in an actual data section of input data to be transferred to the computer as a result of controlling the determined one function, the unique standard data indicating from which one of the two or more specific functions the input data is to be transferred, and wherein the controlling unit is configured to transfer the input data to the computer as data from the compound logic unit.

2. A multifunction device according to claim 1, wherein the two or more specific functions are two or more functions selected from a printer function, scanner function, and PC-FAX function.

3. A multifunction device according to claim 1, further comprising a responding unit configured to return a response indicating a USB storage class to the computer when establishing a connection with the computer when a request for a device class is received from the computer, wherein the responding unit is configured to return a response indicating a removable disk, CD-ROM, or hard disk when a request for a device type of the compound logic unit is received from the computer.

4. A device control system comprising:
a computer; and
a multifunction device configured to perform a plurality of functions,
wherein the computer and the multifunction device are connected with each other via a universal serial bus (USB) interface,
wherein the computer comprises an operating system (OS) installed thereon that recognizes the multifunction device as a device comprising a plurality of logic units, each logic unit of the plurality of logic units configured to transfer data according to a USB-compliant system, such that the computer uses the plurality of functions of the multifunction device by exchanging input/output data with the plurality of logic units, logic unit of the at least one plurality of logic units being a compound logic unit corresponding to two or more specific functions among the plurality of functions, wherein the computer comprises a computer controlling unit configured to store unique standard data for controlling one of the two or more specific functions in an actual data section of output data, based on an instruction from a data processor functioning on the computer to control the one of the two or more specific functions of the multifunction device, wherein the computer controlling unit is configured to transfer the output data to the compound logic unit, and wherein the computer controlling unit is configured to determine from which of the two or more specific functions input data has been transferred, based on unique standard data comprised in an actual data section of the input data, when the input data is transferred from the multifunction device to the computer, wherein the computer controlling unit is configured to transfer the input data to the data processor, wherein the multifunction device comprises a device controlling unit configured to determine which one of the two or more specific functions particular output data is for controlling, based on unique standard data comprised in an actual data section, when the computer has transferred the particular output data with the actual data section to the compound logic unit based on a Logical Unit Number (LUN) corresponding to the compound logic unit, wherein the device controlling unit is configured to control the determined function based on the output data, wherein the device controlling unit is configured to store unique standard data in an actual data section of input data to be transferred to the computer as a result of controlling the determined one function, the unique standard data indicating from which one of the two or more specific functions the input data is to be transferred, wherein the unique standard data is different from the LUN, and wherein the device controlling unit is configured to transfer the input data to the computer as data from the compound logic unit.

5. The device control system according to claim 4, wherein the multifunction device further comprises a responding unit configured to return a response indicating a USB storage class to the computer when establishing a connection with the computer when a request for a device class is received from the computer, wherein the responding unit is configured to return a response indicating a removable disk, CD-ROM, or hard disk when a request for a device type of the compound logic unit is received from the computer.

6. The device control system according to claim 5, wherein the OS of the computer is configured to assign a drive letter to a removable disk when the multifunction device returns a response indicating that the device type of the compound logic unit is a device equivalent to the removable disk, and wherein the computer further comprises a display setting modifying unit configured to modify a display setting to prevent the existence of a device corresponding to the drive letter from being displayed on a display unit of the computer.

7. A device control system according to claim 5, wherein the OS of the computer is configured to assign a drive letter to a CD-ROM when the multifunction device returns a response indicating that the device type of the compound logic unit is a device equivalent to a CD-ROM, and wherein the computer further comprises a deleting unit configured to delete the drive letter assignment.

8. A device control system according to claim 4, wherein the computer controlling unit comprises:

two or more device drivers provided in association with the two or more specific functions; and a data managing unit configured to transfer data between the two or more device drivers and the OS, wherein each device driver is configured to generate, based on an instruction from a data processor functioning on the computer to control a corresponding one of the two or more functions of the multifunction device, data for controlling the corresponding one of the two or more functions and is configured to transfer the data to the data managing unit, wherein the data managing unit is configured to store, based on the data transferred from the each device driver, unique standard data for controlling the corresponding one of the two or more specific functions in an actual data section of the output data and is configured to transfer the output data to the compound logic unit, wherein the data managing unit is configured to determine from which of the two or more specific functions input data has been transferred, based on unique standard data comprised in an actual data section of the input data, when input data is transferred from the multifunction device to the computer, and wherein the data managing unit is configured to transfer the input data to the corresponding device driver, and wherein the corresponding device driver is configured to transfer the input data to the data processor.

* * * * *